United States Patent
Joffre et al.

(10) Patent No.: US 8,247,357 B2
(45) Date of Patent: Aug. 21, 2012

(54) FILLER TREATING AGENTS BASED ON HYDROGEN BONDING POLYORGANOSILOXANES

(75) Inventors: Eric Jude Joffre, Midland, MI (US); Don Kleyer, Hemlock, MI (US)

(73) Assignee: Dow Corning Corporation, Midland, MI (US)

( * ) Notice: Subject to any disclaimer, the term of this patent is extended or adjusted under 35 U.S.C. 154(b) by 411 days.

(21) Appl. No.: 12/525,573

(22) PCT Filed: Jan. 22, 2008

(86) PCT No.: PCT/US2008/000777
§ 371 (c)(1),
(2), (4) Date: Aug. 3, 2009

(87) PCT Pub. No.: WO2008/103219
PCT Pub. Date: Aug. 28, 2008

(65) Prior Publication Data
US 2010/0105582 A1    Apr. 29, 2010

Related U.S. Application Data

(60) Provisional application No. 60/902,205, filed on Feb. 20, 2007.

(51) Int. Cl.
*C10M 125/26* (2006.01)
*C10M 155/02* (2006.01)
(52) U.S. Cl. .................... 508/202; 508/208
(58) Field of Classification Search .......... 508/107, 508/136, 173, 202, 208
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk |
| 3,419,593 A | 12/1968 | Willing |
| 3,445,420 A | 5/1969 | Kookootsedes et al. |
| 3,516,946 A | 6/1970 | Modic et al. |
| 3,814,730 A | 6/1974 | Karstedt |
| 3,989,667 A | 11/1976 | Lee et al. |
| 3,989,668 A | 11/1976 | Lee et al. |
| 4,310,469 A | 1/1982 | Crivello |
| 4,313,988 A | 2/1982 | Koshar et al. |
| 4,370,358 A | 1/1983 | Hayes et al. |
| 4,501,861 A | 2/1985 | Woodbrey |
| 4,558,110 A | 12/1985 | Lee |

(Continued)

FOREIGN PATENT DOCUMENTS

EP    0 347 895 B1    11/1993

(Continued)

OTHER PUBLICATIONS

JP 62-068820, published Mar. 28, 1987, KAO Corporation. Abstract only.

(Continued)

*Primary Examiner* — Walter D Griffin
*Assistant Examiner* — Taiwo Oladapo
(74) *Attorney, Agent, or Firm* — James L. Cordek

(57) ABSTRACT

A composition includes (i) a matrix, (ii) a filler, and (iii) a filler treating agent; where the filler treating agent comprises a polyorganosiloxane capable of hydrogen bonding. The filler treating agent can be a saccharide-siloxane polymer, an amino-functional polyorganosiloxane, or a combination thereof.

17 Claims, 3 Drawing Sheets

U.S. PATENT DOCUMENTS

| | | | |
|---|---|---|---|
| 4,584,355 | A | 4/1986 | Blizzard et al. |
| 4,584,361 | A | 4/1986 | Janik et al. |
| 4,585,836 | A | 4/1986 | Homan et al. |
| 4,591,622 | A | 5/1986 | Blizzard et al. |
| 4,591,652 | A | 5/1986 | DePasquale et al. |
| 4,604,442 | A | 8/1986 | Rich |
| 4,631,329 | A | 12/1986 | Gornowicz et al. |
| 4,707,531 | A | 11/1987 | Shirahata |
| 4,766,176 | A | 8/1988 | Lee et al. |
| 4,774,281 | A | 9/1988 | Chaffee et al. |
| 4,784,879 | A | 11/1988 | Lee et al. |
| 4,793,555 | A | 12/1988 | Lee et al. |
| RE33,141 | E | 1/1990 | Gornowicz et al. |
| 4,962,076 | A | 10/1990 | Chu et al. |
| 5,011,870 | A | 4/1991 | Peterson |
| 5,017,654 | A | 5/1991 | Togashi et al. |
| 5,036,117 | A | 7/1991 | Chung et al. |
| 5,051,455 | A | 9/1991 | Chu et al. |
| 5,053,442 | A | 10/1991 | Chu et al. |
| 5,075,038 | A | 12/1991 | Cole et al. |
| 5,175,325 | A | 12/1992 | Brown et al. |
| 5,227,093 | A | 7/1993 | Cole et al. |
| 5,310,843 | A | 5/1994 | Morita |
| 5,352,724 | A | 10/1994 | Fujiki et al. |
| 5,380,527 | A | 1/1995 | Legrow et al. |
| 5,493,041 | A | 2/1996 | Biggs et al. |
| 5,665,155 | A | 9/1997 | Hohner et al. |
| 5,831,080 | A | 11/1998 | Sejpka et al. |
| 5,856,425 | A | 1/1999 | Rosenfeld et al. |
| 5,981,680 | A | 11/1999 | Petroff et al. |
| 6,051,216 | A | 4/2000 | Barr et al. |
| 6,136,758 | A | 10/2000 | Yamada et al. |
| 6,196,142 | B1 | 3/2001 | Ohlsen |
| 6,239,194 | B1 | 5/2001 | Standke et al. |
| 6,255,429 | B1 | 7/2001 | Griffin et al. |
| 6,361,716 | B1 | 3/2002 | Kleyer et al. |
| 6,372,833 | B1 | 4/2002 | Chen et al. |
| 6,433,055 | B1 | 8/2002 | Kleyer et al. |
| 6,448,329 | B1 | 9/2002 | Hirschi et al. |
| 6,465,550 | B1 | 10/2002 | Kleyer et al. |
| 6,500,883 | B1 | 12/2002 | Mack et al. |
| 6,517,933 | B1 | 2/2003 | Soane et al. |
| 6,534,581 | B1 | 3/2003 | Kleyer et al. |
| 6,783,692 | B2 | 8/2004 | Bhagwagar |
| 6,791,839 | B2 | 9/2004 | Bhagwagar |
| 6,815,486 | B2 | 11/2004 | Bhagwagar et al. |
| 7,074,490 | B2 | 7/2006 | Feng et al. |
| 7,354,982 | B2 | 4/2008 | Yoshitake et al. |
| 2004/0254275 | A1 | 12/2004 | Fukui et al. |
| 2006/0216259 | A1 | 9/2006 | Haubennestel et al. |

FOREIGN PATENT DOCUMENTS

| | | |
|---|---|---|
| EP | 0 562 922 B1 | 5/1997 |
| EP | 1 331 248 B1 | 7/2007 |
| WO | WO 94/29324 A1 | 12/1994 |
| WO | WO 02/088456 A1 | 11/2002 |
| WO | WO 2005/047378 A2 | 5/2005 |
| WO | WO 2006/025552 A1 | 3/2006 |
| WO | WO 2006/064928 A1 | 6/2006 |
| WO | WO 2006/065282 A1 | 6/2006 |
| WO | WO 2006065282 A1 * | 6/2006 |
| WO | WO 2006071772 A2 * | 7/2006 |
| WO | WO 2006/107003 A1 | 10/2006 |
| WO | WO 2006/107004 A1 | 10/2006 |
| WO | WO 2006/127882 A2 | 11/2006 |
| WO | WO 2006/127883 A2 | 11/2006 |
| WO | WO 2007/139812 A2 | 12/2007 |

OTHER PUBLICATIONS

JP 61-096593, Dec. 22, 1992, Nitto Denko Corporation. Abstract only.

JP 03-290127, Dec. 19, 1991, Ota Toshiyuki. Abstract only.

Amari, Wantanabe, "Rheological Properties of Disperse Systems of Pigment," Polym. Eng. Reviews, 1981, p. 277, vol. 3.

Aoki, Hatano, and Wanatanbe, "Rheology of Carbon Black Suspensions. I. Three Types of Viscoelastic Behavior," Rheol. Acta, 2003, p. 209, vol. 42.

Simionescu, Bogdan C., Valeria Harabagiu and Cristofor I. Simionescu, "Siloxane-Containing Polymers" in The Polymeric Materials Encyclopedia, CRC Press, Inc., 1996.

Hardman, Bruce, Arnold Torkelson, "Silicones" in Encyclopedia of Polymer Science and Engineering, Edited by H.F. Mark, et.al., 1989, p. 243, vol. 15.

Costello, et. al., "Surface Treatment Compositions Comprising Saccharide-Siloxane Copolymers".

Elliot, Kelly and Windle, "Recursive Packing of Dense Particle Mixtures," Journal of Materials Science Letters, 2002, pp. 1249-1251, vol. 21.

Yilgor, I. et. al., "Polymer Bulletin", 1982, pp. 535-542, vol. 8.

McGrath, McGrath, "Research on Thermoplastic Elastomers" in Thermoplastic Elastomers, A Comprehensive Review, Edited by N. R. Legge, et.al., Hanser Publishers, 1987, pp. 465-480.

Otsubo, "Effect of Particle Size on the Bridging Structure and Elastic Properties of Flocculated Suspensions," J. Colloid. Interface. Sci., 1992, p. 584, vol. 153.

* cited by examiner

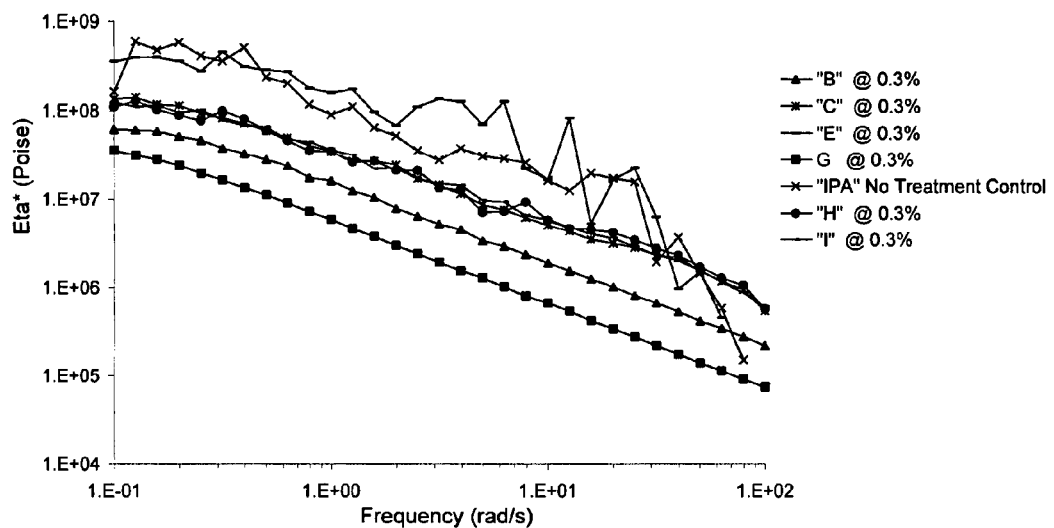
Figure 1: Treatment Comparison, After 90% Dispersion Aged 12-13 Days 0.3% Treatment Monosaccharide and Amino Siloxanes
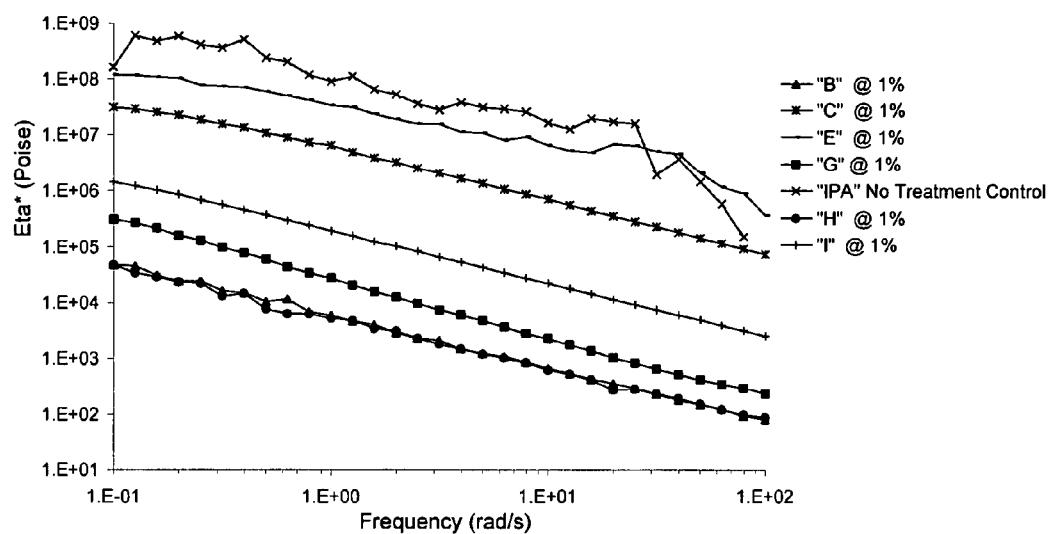
Figure 2: Treatment Comparison, After 90% Dispersion Aged 12-13 Days 1% Monosaccharide and Amino Siloxanes

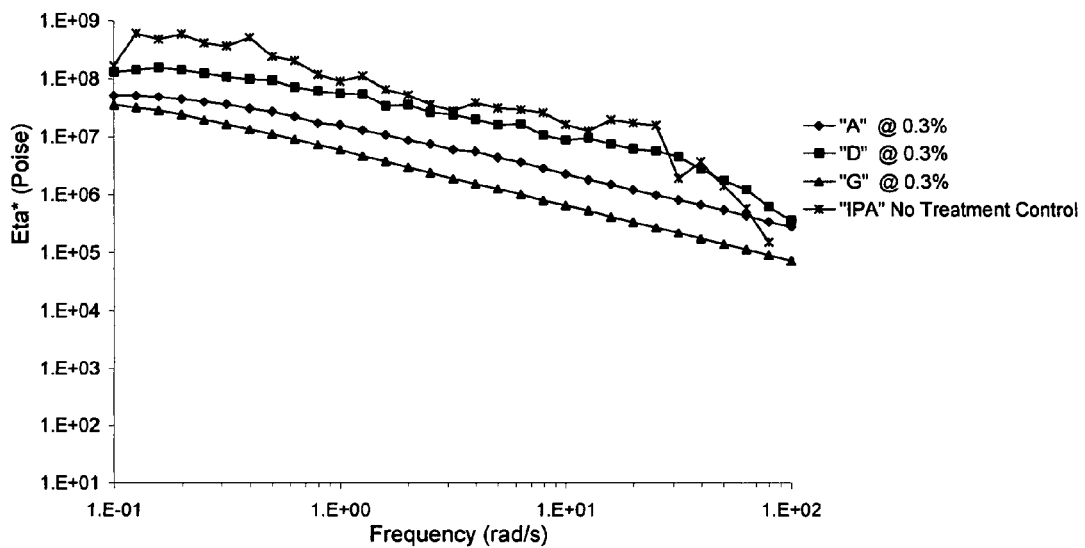
Figure 3: Treatment Comparison, After 90% Dispersion Aged 12-13 Days 0.3% Disaccharide Siloxanes
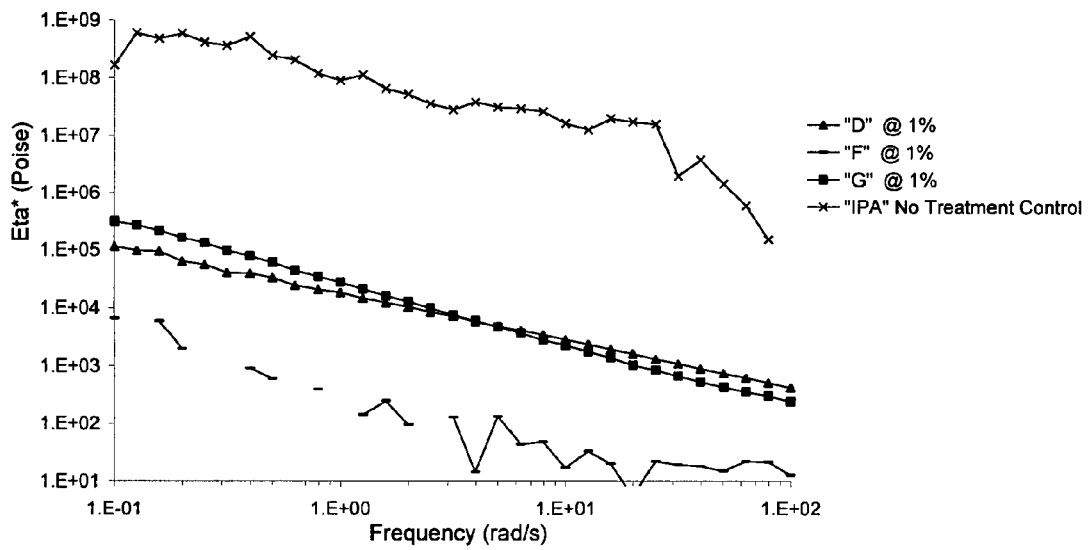
Figure 4: Treatment Comparison, After 90% Dispersion Aged 12-13 Days 1% Disaccharide Siloxanes

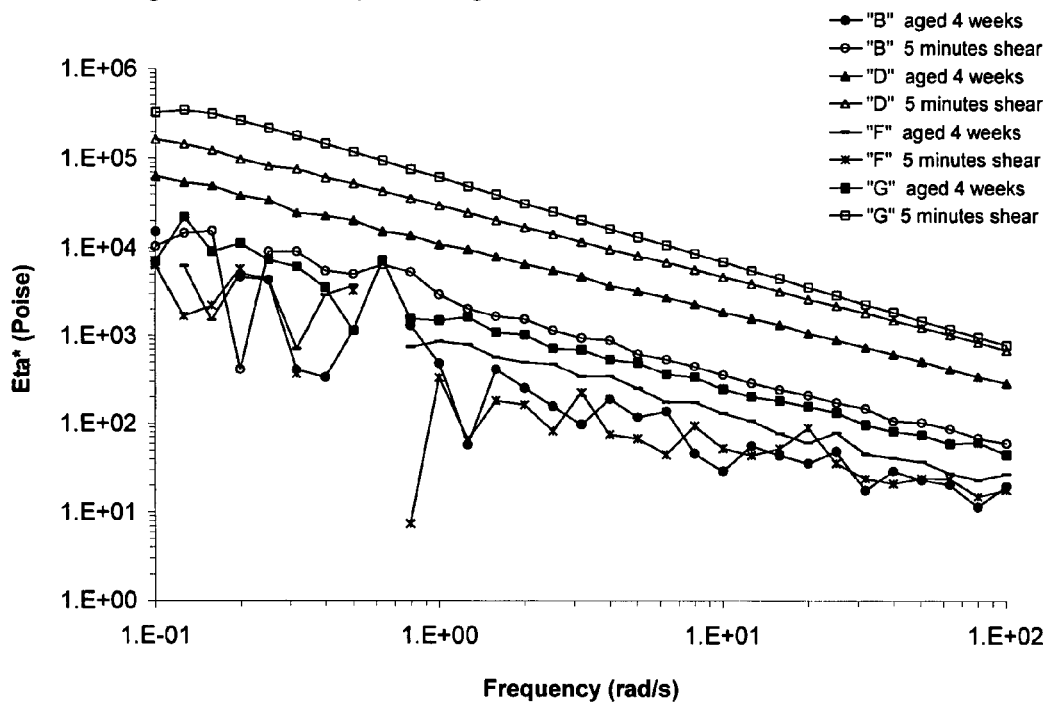
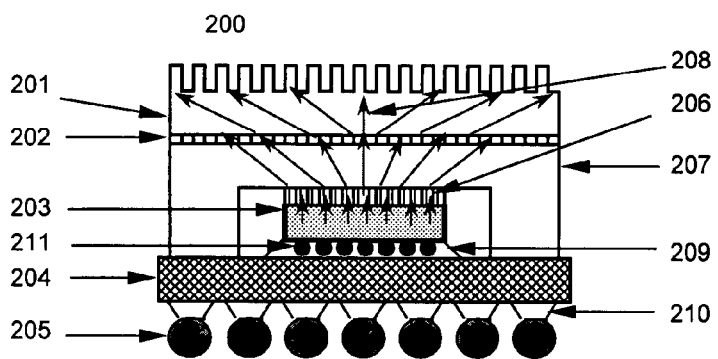
Figure 6

US 8,247,357 B2

FILLER TREATING AGENTS BASED ON HYDROGEN BONDING POLYORGANOSILOXANES

CROSS REFERENCE TO RELATED APPLICATIONS

This application is a U.S. national stage filing under 35 U.S.C. §371 of PCT Application No. PCT/US08/000777 filed on 22 Jan. 2008, currently pending, which claims the benefit of Provisional Patent Application Ser. No. 60/902,205 filed 20 Feb. 2007 under 35 U.S.C. §119 (e). PCT Application No. PCT/US08/000777 and Provisional Patent Application Ser. No. 60/902,205 are hereby incorporated by reference.

BACKGROUND OF THE INVENTION

Technical Field

Treated fillers are prepared using a polyorganosiloxane capable of hydrogen bonding. The treated fillers may be dispersed into a matrix, such as polyorganosiloxane liquids, organofunctional silicone waxes, polyorganosiloxane resins, or curable compositions. The resulting composition may be thermally conductive, electrically conductive, both, or neither. The thermally conductive compositions are useful in thermal interface material (TIM) applications. The electrically conductive compositions are useful in various application including electromagnetic interference (EMI) shielding applications. The nonconductive compositions are useful in various applications, such as making elastomers.

Problems to be Solved

Generally, higher filler loading in the matrix yields various benefits. For nonconductive fillers, increasing filler loading in a composition may increase strength of an elastomer prepared from the composition. For conductive fillers, conductivity generally increases as filler loading increases, and this trend applies to both electrical and thermal conductivity. Some fillers commonly used are aluminum oxide for thermal conductivity and silver for both thermal and electrical conductivity. To date, aluminum oxide filler treatments have comprised the majority of the attempts to improve performance of thermally conductive compositions. The filler treatments used frequently have two distinct functional moieties, a reactive or tether moiety intended to anchor the treatment to the aluminum oxide surface and a compatibilization moiety intended to provide favorable interaction with the composition matrix. Examples include MeSi(OMe)$_3$, PhSi(OMe)$_3$, R'Si(OMe)$_3$ where R$^1$ represents an alkyl group such as a C$_{6-18}$ alkyl group, M$^{Me}$D$^{Me}_x$Si(OMe)$_3$, M$^{Vi}$D$_x$Si(OMe)$_3$, HO(Me$_2$SiO)$_{14}$H, (Me$_3$Si)$_2$NH, and acetoxy analogs, where subscript x has a value ranging from 25 to 110. However, it has been found that in these treatment agents, the reactive functionality does not necessarily form a stable linkage, expected to be in the form of e.g., AlOSi bonds, with the filler surface. The reactive functionality may result in fugitive by-products during filler surface treatment that increase processing costs. Further, since the reactive functionality can be consumed with subsequent shear, generated fresh filler surface resulting from such shear remains untreated.

For improved performance, there is a need in the art to pursue technology that enables higher filler loading in a matrix with minimal detriment to the ability to process usually equated with composition viscosity.

BRIEF SUMMARY OF THE INVENTION

An alternative strategy to treating the filler surface takes advantage of multiple hydrogen bonds, either clustered or dispersed or both, as the means to tether the compatibilization moiety to the filler surface. A polyorganosiloxane capable of hydrogen bonding is useful as a filler treating agent.

BRIEF DESCRIPTION OF THE DRAWINGS

FIG. 1 is a graph showing viscosity of compositions after 12 to 13 days aging. These compositions are described in the examples below and contained filler treated with 0.3% of an amino-functional polydimethylsiloxane polymer or a saccharide-siloxane polymer, which is a reaction product of an amino-functional polydimethylsiloxane and gluconolactone.

FIG. 2 is a graph showing viscosity of compositions after 12 to 13 days aging. These compositions are described in the examples below and contained filler treated with 1% of an amino-functional polydimethylsiloxane polymer or a saccharide-siloxane polymer, which is a reaction product of an amino-functional polydimethylsiloxane and gluconolactone.

FIG. 3 is a graph showing viscosity of compositions after 12 to 13 days aging. These compositions are described in the examples below and contained filler treated with 0.3% of a saccharide-siloxane polymer, which is a reaction product of an amino-functional polydimethylsiloxane and lactobionolactone.

FIG. 4 is a graph showing viscosity of compositions after 12 to 13 days aging. These compositions are described in the examples below and contained filler treated with 1% of a saccharide-siloxane polymer, which is a reaction product of an amino-functional polydimethylsiloxane and lactobionolactone.

FIG. 5 is a graph showing viscosity of compositions after 4 weeks of aging, before and after additional shear.

FIG. 6 is a device having a TIM fabricated from a composition described herein.

DETAILED DESCRIPTION OF THE INVENTION

All amounts, ratios, and percentages are by weight unless otherwise indicated. Articles 'a', 'an', and 'the' each mean one or more. 'M' represents a unit of formula R$_3$SiO$_{1/2}$, 'D' represents a unit of formula R$_2$SiO$_{2/2}$, 'T' represents a unit of formula RSiO$_{3/2}$, and Q represents a unit of formula SiO$_{4/2}$, where R is a monovalent group or atom. 'Me' represents a methyl group, 'Et' represents an ethyl group, 'Ph' represents a phenyl group, 'Pr' represents a propyl group, and 'Vi' represents a vinyl group. 'M$^{Me}$' represents a trimethylsiloxy unit of formula Me$_3$SiO$_{1/2}$, 'M$^{Vi}$' represents a dimethylvinylsiloxy unit of formula (Me)$_2$ViSiO$_{1/2}$, and 'D$^{Me}$' represents a dimethylsiloxy unit of formula Me$_2$SiO$_{2/2}$. 'Mw' means weight average molecular weight.

Polyorganosiloxane Capable of Hydrogen Bonding

The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to a filler. The polyorganosiloxane may be incapable of forming covalent bonds with the filler. The polyorganosiloxane may be free of condensable silyl groups e.g., silicon bonded alkoxy groups, silazanes, and silanols. The polyorganosiloxane capable of hydrogen bonding may be selected from the group consisting of a saccharide-siloxane polymer, an amino-functional polyorganosiloxane, and a combination thereof. Alternatively, the polyorganosiloxane capable of hydrogen bonding may be a saccharide-siloxane polymer.

Saccharide-Siloxane Polymer

A saccharide-siloxane polymer has the unit formula (I):

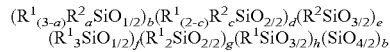

Each subscript a is independently 0, 1, 2, or 3. Subscript c is 0, 1, or 2. On average per molecule, the quantity (a+c) may be at least 1. Subscript b is 0 or greater. Subscript d is 0 or greater. Subscript e is 0 or greater. The quantity (b+d+e) is 1 or greater. Subscript f is 0 or greater. Subscript g is 0 or greater. Subscript h is 0 or greater. Subscript i is 0 or greater. When e, h, and i are all 0, then the saccharide-siloxane polymer is linear, and the polymer may have the following formula (II):

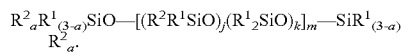

In the formulae above, each $R^1$ can be the same or different. Each $R^1$ comprises hydrogen, an alkyl group of 1 to 12 carbon atoms, an organic group, or a group of formula $R^3$-Q. Q comprises an epoxy, cycloepoxy, primary or secondary amino, ethylenediamine, carboxy, halogen, vinyl, allyl, anhydride, or mercapto functionality. Subscripts j and k are integers ranging from 0 to 10,000 and may be the same or different. Subscript m is an integer such that the polymer has a molecular weight less than 1 million.

Each $R^2$ has the formula $Z\text{-}(G^1)_n\text{-}(G^2)_o$, and there is an average of at least one $R^2$ per polymer molecule. $G^1$ is a saccharide component comprising 5 to 12 carbon atoms. The quantity (n+o) has a value ranging from 1 to 10, and subscript n or subscript o can be 0. $G^2$ is a saccharide component comprising 5 to 12 carbon atoms, and $G^2$ is additionally substituted with organic or organosilicon radicals. Z is a linking group. Each Z is independently selected from the group consisting of:

—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—CH$_2$—O—$R^4$;
—$R^3$—S—$R^4$—;
—$R^3$—CH(OH)—CH$_2$—NH—$R^4$—;
—$R^3$—N($R^1$)—$R^4$—;
—NHC(O)—$R^4$—;
—NHC(O)O—$R^4$—;
—NH—C(O)—NH—$R^4$—;
—C(O)—O—$R^4$—;
—O—$R^4$—;
CH(OH)—CH$_2$—O—$R^4$;
—S—$R^4$—;
—CH(OH)—CH$_2$—NH—$R^4$—;
—N($R^1$)—$R^4$—;
—$R^3$—NHC(O)—;
—$R^3$—NHC(O)O—;
—$R^3$—NH—C(O)—NH—;
—$R^3$—C(O)—O—;
—$R^3$—O—;
—$R^3$—CH(OH)—CH$_2$—O—;
—$R^3$—S—;
—$R^3$—CH(OH)—CH$_2$—NH—; and
—$R^3$—N($R^1$)—.

Each $R^3$ and each $R^4$ is independently a divalent spacer comprising a group of formula $(R^5)_r(R^6)_s(R^7)_t$, where subscripts r, s, and t are each independently 0 or 1, and at least one of subscripts r, s and t is 1. Each $R^5$ and each $R^7$ are independently either an alkylene group of 1 to 12 carbon atoms or a group of formula $(R^9O)_p$, where $R^9$ is a divalent organic group such as an alkylene group of 1 to 12 carbon atoms, subscript p is an integer ranging from 1 to 50, and each $R^9O$ may be the same or different. $R^6$ is —$N(R^8)$—, where $R^8$ is hydrogen, or an alkyl group of 1 to 12 carbon atoms. Each X is independently a divalent carboxylic acid, phosphate, sulfate, sulfonate or quaternary ammonium radical. The saccharide-siloxane polymer is a reaction product of a functionalized organosiloxane polymer and at least one hydroxy-functional saccharide such that the organosiloxane component is covalently linked via the linking group, Z, to the saccharide component. Without wishing to be bound by theory, it is thought that when a filler treated with the saccharide-siloxane polymer will be dispersed in a curable matrix, the groups chosen for one or more of $R^1$, and $R^9$, may be selected such that they are reactive with the matrix to improve compatibility or provide reinforcement. For example, when a hydrosilylation reaction curable matrix is selected, one or more of groups $R^1$ and $R^9$ may contain an alkenyl group such as vinyl.

Alternatively, the saccharide-siloxane polymer may have the formula (III):

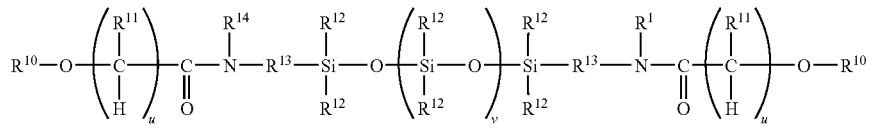

where each subscript u is independently 5 to 12 and subscript v has a value ranging from 0 to 10,000, alternatively 11 to 300.

Each $R^{14}$ is independently a hydrogen atom or a monovalent hydrocarbon group of 1 to 4 carbon atoms. Each $R^{13}$ is independently a divalent organic group. Divalent organic groups are exemplified by unsubstituted divalent hydrocarbon groups, e.g., alkylene groups such as ethylene, propylene, and butylene and substituted divalent hydrocarbon groups such as divalent amino-functional groups such as propylaminoethyl (e.g., —(CH$_2$)$_3$N—(CH$_2$)$_2$—). Alternatively, each $R^{13}$ may be propyl. Alternatively, each $R^{13}$ may be propylaminoethyl.

Each $R^{12}$ is independently a monovalent unsubstituted hydrocarbon group. Examples of monovalent unsubstituted hydrocarbon groups include alkyl groups, alkenyl groups, cycloalkyl groups, and aromatic groups. Alkyl groups include methyl, ethyl, and propyl. Alkenyl groups include vinyl and allyl. Cycloalkyl groups include cyclopentyl and cyclohexyl. Aromatic groups include phenyl, tolyl, xylyl, and benzyl.

Each $R^{11}$ is independently a hydrogen atom, a hydroxyl group, an alkoxy group, or a saccharide group. Alkoxy groups are exemplified by methoxy, ethoxy, propoxy, and butoxy.

Each $R^{10}$ is a hydrogen atom or a monovalent substituted or unsubstituted hydrocarbon group. Without wishing to be bound by theory, it is thought that when a filler treated with the saccharide-siloxane polymer will be dispersed in a curable matrix, the groups chosen for one or more of $R^{14}$, $R^{12}$, $R^{11}$, and $R^{10}$, may be selected such that they are reactive with the matrix to improve compatibility. For example, when a hydrosilylation reaction curable matrix is selected, one or more of groups $R^{14}$, $R^{12}$, $R^{11}$, and $R^{10}$ may contain an alkenyl group such as vinyl.

Examples of the saccharide-siloxane polymer with this formula include the following.

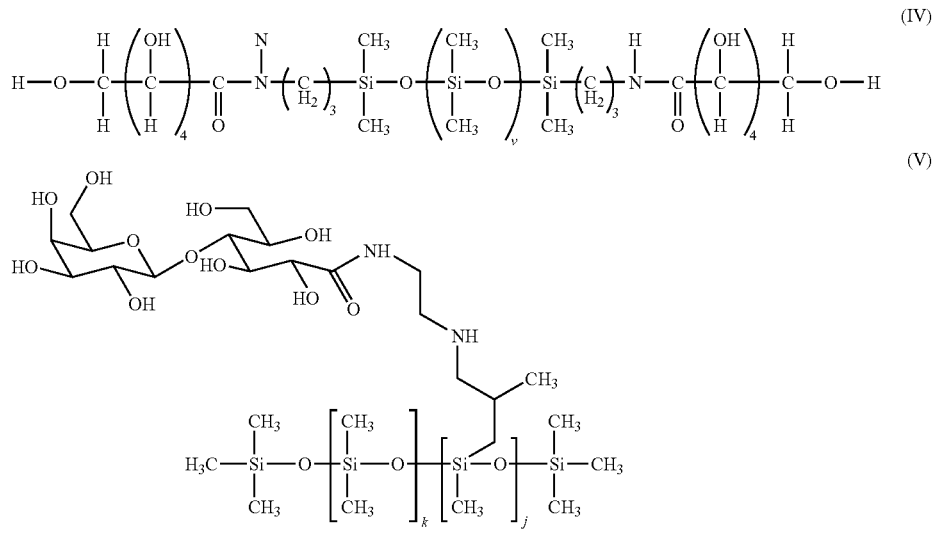

Methods of Manufacture

Saccharide-siloxane polymers, and processes for making them, are known in the art. For example, U.S. Pat. No. 4,591,652 describes methods for manufacturing polyhydroxyl silanes by reacting silanes having amine-terminated substituents with aldonic acid lactones. Japanese Patent No. 62-68820 discloses organopolysiloxanes comprising saccharide residues made from aminosiloxanes and saccharide lactones. WO 94/29324 describes siloxanyl-modified compounds, including surface-active or surface-modifying agents formed from epoxy-trisiloxane reaction products and saccharide lactones and methods for their preparation. WO 02/088456 describes amido-functional aminopolydiorganosiloxanes formed from reacting aminosiloxanes and saccharide lactones. WO 2006/127882 discloses exemplary saccharide-siloxane polymers.

Synthetic processes for linking saccharides and siloxanes are also known in the art. For example, U.S. Pat. No. 5,831,080 describes organosilicone compounds containing glycoside radicals made by hydrosilylating allyl functional saccharide groups. U.S. Pat. No. 6,517,933 B1 describes a hybrid polymer material comprising a set of naturally occurring building blocks, which include saccharides, and a set of synthetic building blocks which include polysiloxanes. A number of potential linking chemistries are described. The complete disclosures of the aforementioned patent references are hereby incorporated by reference. Additionally the saccharide-siloxane polymers can be modified by further reaction of anionic or cationic monomers to functional sites on the saccharide-siloxane polymer.

An exemplary saccharide-siloxane polymer described above may be prepared by reacting (A) an amino-functional polyorganosiloxane and (B) a lactone in a 1:1 molar ratio. Ingredient (A) is an amino-functional polyorganosiloxane. Ingredient (A) may have the formula (VI):

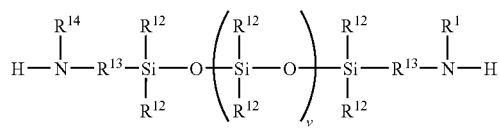

where $R^{12}$, $R^{13}$, $R^{14}$, and subscript v are as described above.

Ingredient (A) is exemplified by trimethylsiloxy-terminated poly(dimethylsiloxane/methyl(aminoethylaminoisobutyl)siloxane), poly(dimethylsiloxane/methyl(aminopropyl)siloxane), and combinations thereof.

Ingredient (B) is a lactone. Ingredient (B) may have formula (VII):

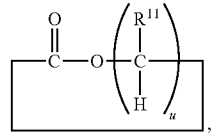

where $R^{11}$ and subscript u are as described above. Ingredient (B) is exemplified by butyrolactone, epsilon caprolactone and delta gluconolactone. Alternatively, ingredient (B) may be lactobionolactone.

Amino-Functional Polyorganosiloxane

The polyorganosiloxane capable of hydrogen bonding may be an amino-functional polyorganosiloxane. The amino-functional polyorganosiloxane may have unit formula (XVIII): $(R^{34}_{(3-eee)}R^{35}_{eee}SiO_{1/2})_{\mathit{fff}}(R^{34}_{ggg}R^{35}_{(2-ggg)}SiO_{2/2})_{hhh}(R^{35}SiO_{3/2})_{iii}$ $(R^{34}_{3}SiO_{1/2})_{jjj}(R^{34}_{2}SiO_{2/2})_{kkk}$ $(R^{34}SiO_{3/2})_{mmm}SiO_{4/2})_{nnn}$. In unit formula (XVIII), each subscript eee is independently 0, 1, 2, or 3. Subscript ggg is 0, 1, or 2. Subscript fff is 0 or greater. Subscript hhh is 0 or greater. Subscript iii is 0 or greater. The quantity (fff+hhh+iii)

is 1 or greater. Subscript jjj is 0 or greater. Subscript kkk is 0 or greater. Subscript mmm is 0 or greater. Subscript nnn is 0 or greater. When iii, mmm, and nnn are all 0, then the amino-functional polyorganosiloxane is linear and may have the following formula (XIX):

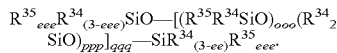

In the formulae above, each $R^{34}$ can be the same or different. Each $R^{34}$ comprises a hydrogen atom or an organic group. Suitable organic groups include substituted and unsubstituted hydrocarbon groups. Examples of suitable unsubstituted hydrocarbon groups include alkyl groups, such as alkyl groups of 1 to 12 carbon atoms. Examples of alkyl groups include methyl, ethyl, propyl, butyl, hexyl, heptyl, undecyl, and decyl. Alternatively, each $R^{34}$ may be methyl. Each $R^{35}$ comprises an amino-functional group, and each $R^{35}$ can be the same or different. Examples of suitable amino-functional groups include aminoethyl, aminopropyl, aminobutyl, aminoethylaminopropyl, and aminoethylaminoisobutyl. Each subscript ooo is independently an integer having a value ranging from 0 to 10,000. Each subscript ppp is independently an integer having a value ranging from 1 to 10,000. Each subscript ooo and each subscript ppp may be the same or different. Subscript qqq is an integer with a value such that the amino-functional polyorganosiloxane has a molecular weight less than 1 million.

Examples of the amino-functional polyorganosiloxane include, but are not limited to, trimethylsiloxy-terminated, (dimethyl, methyl(aminoethylaminoisobutyl))siloxane; trimethylsiloxy-terminated, (dimethyl, methyl(aminoethylaminopropyl))siloxane; dimethyl, methyl(aminoethylaminoisobutyl)siloxy-terminated, polydimethylsiloxane; dimethyl, methyl(aminoethylaminopropyl)siloxy-terminated, polydimethylsiloxane; and combinations thereof.

The polyorganosiloxane capable of hydrogen bonding described above may be used as a filler treating agent. The filler treating agent may be used to treat the filler, increase the filler loading, or both, of the compositions described, for example, in U.S. Pat. Nos. 5,075,038; 5,011,870; 5,227,093; 6,534,581; 6,361,716; 6,465,550; 6,433,055; 6,448,329; 6,783,692; 6,791,839; 6,815,486; and 7,074,490 and in publications WO 2005/047378, WO 2006/025552, WO 2006/065282, WO 2006/064928, WO 2006/107003, and WO 2006/107004, all of which are hereby incorporated by reference for the purpose of disclosing suitable fillers and matrices in which the treated fillers can be dispersed.

Compositions

The polyorganosiloxane capable of hydrogen bonding described above may be used to treat a filler used in a composition, which comprises:
(i) a matrix,
(ii) a filler, and
(iii) a filler treating agent where the filler treating agent comprises a polyorganosiloxane capable of hydrogen bonding, as described above.

Matrix

The matrix is not specifically restricted. The matrix may be a non-curable material, such as a polyorganosiloxane fluid, organofunctional silicone wax, polyorganosiloxane resin such as an MQ resin or a DT resin, or silicone-organic block copolymer. When the matrix is non-curable, the composition may be, for example, a grease or a phase change composition.

Organofunctional Silicone Wax

Organofunctional silicone waxes are known in the art and commercially available. The wax comprise an uncrosslinked organofunctional silicone wax, a crosslinked organofunctional silicone wax, or a combination thereof. Uncrosslinked organofunctional silicone waxes may have the formula (VIII):

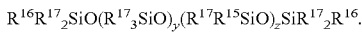

Each $R^{15}$ is independently an organic waxy group such as a substituted or unsubstituted monovalent hydrocarbon group of at least 16 carbon atoms, alternatively at least 20 carbon atoms, alternatively at least 24 carbon atoms, alternatively at least 26 carbon atoms. The maximum number of carbon atoms is not specifically restricted and may be higher than 30 carbon atoms. The uncrosslinked organofunctional silicone wax may be prepared by methods known in the art such as that described in U.S. Pat. No. 5,380,527 (col. 3, lines 10-57).

The monovalent hydrocarbon group for $R^{15}$ may be branched or unbranched, saturated or unsaturated, and unsubstituted. Each $R^{16}$ is independently an organic group such as a substituted or unsubstituted monovalent hydrocarbon group of at least 1 carbon atom. $R^{16}$ can be $R^{15}$ or $R^{17}$. The monovalent hydrocarbon group for $R^{16}$ may be branched or unbranched, saturated, and unsubstituted. $R^{16}$ is exemplified by substituted and unsubstituted alkyl groups, substituted and unsubstituted aromatic groups, and a combination thereof. $R^{16}$ can be an unsubstituted alkyl group such as methyl, ethyl, propyl, or butyl.

Each $R^{17}$ is independently an organic group such as a substituted or unsubstituted monovalent hydrocarbon group of 1 to 6 carbon atoms. $R^{17}$ can be branched, unbranched, or cyclic. Cyclic groups for $R^{17}$ include phenyl groups. The monovalent hydrocarbon group for $R^{17}$ may be branched or unbranched, saturated or unsaturated, and unsubstituted. $R^{17}$ can be an unsubstituted alkyl group such as methyl, ethyl, propyl, or butyl. In the formula above, subscript y is 0 to 200, and z is 1 to 200.

Uncrosslinked silicone waxes may be cyclic. Suitable cyclic uncrosslinked organofunctional silicone waxes can have the formula (IX): $(R^{17}{}_2SiO)_{aa}(R^{17}R^{15}SiO)_{bb}$, where $R^{15}$ and $R^{17}$ are as described above. In this formula, subscript aa is greater than or equal to 0, subscript bb is greater than or equal to 1; with the proviso that the quantity (aa+bb) is 1 to 8. A combination of a cyclic uncrosslinked silicone wax and a noncyclic uncrosslinked silicone wax can be used in ingredient (i).

Alternatively, ingredient (i) can comprise a crosslinked organofunctional silicone wax. The crosslinked organofunctional silicone wax can comprise a reaction product of a siloxane having silicon-bonded hydrogen atoms or an organosiloxane having silicon-bonded hydrogen atoms, an alpha-olefin, and a crosslinker, in the presence of a transition metal catalyst. Crosslinked organofunctional waxes are known in the art and commercially available.

U.S. Pat. No. 5,493,041 discloses crosslinked organofunctional siloxane waxes and methods for their preparation. For example, the crosslinked organofunctional silicone wax can be prepared by reacting a commercially available siloxane having silicon-bonded hydrogen atoms with a slight stoichiometric excess of an olefin and an unconjugated alpha, omega-diene crosslinker in the presence of a transition metal (e.g., platinum) catalyst. Olefins are known in the art and commercially available. Mixtures of olefins having different numbers of carbon atoms can be used, for example mixtures of olefins having 30 carbon atoms and olefins having greater than 30 carbon atoms can be used to prepare the crosslinked organofunctional silicone wax. The crosslinker can be an organic group, an organosilicone having an average of at least two alkenyl groups bonded to silicon atoms per molecule, or a combination thereof. One skilled in the art would be able to prepare crosslinked organofunctional siloxane waxes without undue experimentation.

Silicone Resin

Silicone resins are known in the art and commercially available. Silicone resins can comprise combinations of M, D, T, and Q units, such as DT, MDT, DTQ, MQ, MDQ, MDTQ, or MTQ resins; alternatively DT or MQ resins.

DT resins are exemplified by resins comprising the formula (X):

$$(R^{18}R^{19}SiO_{2/2})_{cc}(R^{20}SiO_{3/2})_{dd}.$$

Each instance of $R^{18}$, $R^{19}$, and $R^{20}$ may be the same or different. $R^{18}$ and $R^{19}$ may be different within each unit. Each $R^{18}$, $R^{19}$, and $R^{20}$ independently represent a hydroxyl group or a monovalent organic group, such as a substituted or unsubstituted hydrocarbon group or alkoxy group. Hydrocarbon groups can be saturated or unsaturated. Hydrocarbon groups can be branched, unbranched, cyclic, or combinations thereof. Hydrocarbon groups can have 1 to 40 carbon atoms, alternatively 1 to 30 carbon atoms, alternatively 1 to 20 carbon atoms, alternatively 1 to 10 carbon atoms, alternatively 1 to 6 carbon atoms. The unsubstituted hydrocarbon groups include alkyl groups such as methyl, ethyl, propyl, and butyl; alternatively methyl or ethyl; alternatively methyl and include aromatic groups such as phenyl, tolyl, xylyl, benzyl, and phenylethyl; alternatively phenyl. Unsaturated unsubstituted hydrocarbon groups include alkenyl such as vinyl, allyl, butenyl, and hexenyl.

In the formula above, subscript cc is 1 to 200, alternatively 1 to 100, alternatively 1 to 50, alternatively 1 to 37, alternatively 1 to 25. Subscript dd is 1 to 100, alternatively 1 to 75, alternatively 1 to 50, alternatively 1 to 37, alternatively 1 to 25.

Alternatively, the DT resin may have the formula (XI): $(R^{18}{}_2SiO_{2/2})_{cc}(R^{19}{}_2SiO_{2/2})_{dd}(R^{18}SiO_{3/2})_{cc}(R^{19}SiO_{3/2})_{dd}$, where $R^{18}$, $R^{19}$, cc, and dd are as described above. Alternatively, in this formula, each $R^{18}$ may be an alkyl group and each $R^{19}$ may be an aromatic group.

MQ resins are exemplified by resins of the formula (XII): $(R^{18}R^{19}R^{20}SiO_{1/2})_{ee}(SiO_{4/2})_{ff}$, where $R^{18}$, $R^{19}$, and $R^{20}$ are as described above, subscript ee is 1 to 100, subscript ff is 1 to 100, and the average ratio of ee to ff is 0.65 to 1.9.

A silicone polymer may be added to ingredient (i) in addition to, or instead of a portion of, the silicone resin. The silicone polymer can be added in an amount of 0 to 35% of the composition. The silicone polymer can be a linear or branched polydiorganosiloxane, such as a polydimethylsiloxane. Silicone polymers are exemplified by polymers of the formula $(R^{18}R^{19}R^{20}SiO_{1/2})_2(R^{18}R^{19}SiO_{2/2})_{gg}$, where $R^{18}$, $R^{19}$, and $R^{20}$ are as described above, and subscript gg is 5 to 800, alternatively 50 to 200.

Silicone-Organic Block Copolymer

Silicone-organic block copolymers are known in the art and commercially available. Suitable silicone-organic block copolymers include silicone acrylate block copolymers, silicone-amide block copolymers, silicone-epoxy block copolymers, silicone-ether block copolymers, silicone-imide block copolymers, silicone-styrene block copolymers, silicone-urethane block copolymers, silicone-urea block copolymers, silicone-vinylether block copolymers, and combinations thereof. Silicone-organic block copolymers and methods for their preparation are known in the art, see for example, Bogdan C. Simionescu, Valeria Harabagiu and Cristofor I. Simionescu, "Siloxane-Containing Polymers" in The Polymeric Materials Encyclopedia, CRC Press, Inc., 1996; James E. McGrath, "Research on Thermoplastic Elastomers" in *Thermoplastic Elastomers, A Comprehensive Review*, Edited by N. R. Legge, G. Holden, H. E. Schroeder, Hamer Publishers, 1987; Bruce Hardman and Arnold Torkelson, "Silicones" in *Encyclopedia of Polymer Science and Engineering*, Edited by H. F. Mark, N. M. Bikales, C. G. Overberger, G. Menges, J. I. Kroschwitz, John Wiley & Sons, 1989, vol. 15, page 243; and I. Yilgor, J. S. Riffle, G. L. Wilkes and J. E. McGrath, "Polymer Bulletin", 8, 535-542 (1982). Silicone-organic block copolymers and methods for their preparation can also be found in U.S. Pat. Re. 33,141; 4,558,110; 4,631,329; and 4,793,555. Silicone-urethane block copolymers and silicone-amide block copolymers and methods for their preparation are disclosed in U.S. Pat. Nos. 4,501,861; 4,604,442; 5,981, 680; and 6,051,216.

Cure Package

Alternatively, the matrix may be a cure package. A cure package may comprise (a) base polymer and either (b) a crosslinking agent or (c) a catalyst, or both (b) and (c). Examples of cure packages include addition cure packages, moisture cure packages, peroxide cure packages, and radiation cure packages.

Moisture Cure Package

Ingredient (i) may comprise a moisture cure package. The moisture cure package may comprise: 100 parts by weight of (A) a base polymer, an amount sufficient to cure the package of (B) a crosslinking agent, and optionally an amount sufficient to accelerate curing of the package of (C) a catalyst.

Ingredient (A) Base Polymer

Ingredient (A) in the moisture cure package is a polyorganosiloxane having an average per molecule of at least two hydrolyzable substituents, such as halogen atoms, acetamido groups, acyloxy groups such as acetoxy, alkoxy groups, amido groups, amino groups, aminoxy groups, hydroxyl groups, oximo groups, ketoximo groups, methylacetamido groups, alkoxysilylhydrocarbylene groups, or a combination thereof. The hydrolyzable substituents in ingredient (A) may be located at terminal, pendant, or both terminal and pendant positions. Ingredient (A) may have a linear or branched structure. Ingredient (A) may be a homopolymer or a copolymer.

Ingredient (A) may comprise an alkoxy-endblocked polydiorganosiloxane, a alkoxysilylhydrocarbylene-endblocked polydiorganosiloxane, a hydroxyl-endblocked polydiorganosiloxane, or a combination thereof.

Ingredient (A) may comprise a polydiorganosiloxane of formula (XIII):

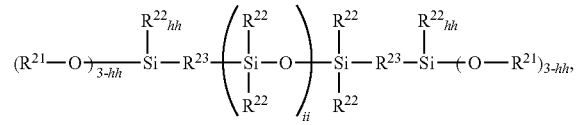

where each $R^{21}$ is independently a hydrolyzable substituent, each $R^{22}$ is independently a monovalent organic group, each $R^{23}$ is independently an oxygen atom or a divalent hydrocarbon group, each subscript hh is independently 0, 1, or 2, and ii is an integer having a value sufficient to provide the polydiorganosiloxane with a viscosity of at least 100 mPa·s at 25° C.

Suitable hydrolyzable substituents for $R^{21}$ include, but are not limited to, a halogen atom, an acetamido group, an acetoxy group, an acyloxy group, an alkoxy group, an amido group, an amino group, an aminoxy group, a hydroxyl group, an oximo group, a ketoximo group, and a methylacetamido group.

Suitable organic groups for $R^{22}$ include, but are not limited to, monovalent substituted and unsubstituted hydrocarbon groups. Examples of monovalent unsubstituted hydrocarbon groups for $R^{22}$ include, but are not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl. Examples of monovalent substituted hydrocarbon groups for $R^{22}$ include, but are not limited to, monovalent halogenated hydrocarbon groups such as chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of monovalent substituted hydrocarbon groups for $R^{22}$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^{22}$ may be an alkyl group.

Ingredient (A) may comprise an α,ω-difunctional-polydiorganosiloxane when, in formula (XIII) above, each subscript hh is 2 and each $R^{23}$ is an oxygen atom. For example, ingredient (A) may have formula (XIV): $R^{21}R^{22}{}_2SiO—(R^{22}{}_2SiO)_{ii}—SiR^{22}{}_2R^{21}$, where $R^{21}$ and $R^{22}$ are as described above and subscript ii is an integer having a value ranging from 50 to 1,000, alternatively 200 to 700.

Ingredient (A) may comprise a hydroxyl-functional polydiorganosiloxane of the formula described above, in which each $R^{21}$ may be a hydroxyl group, each $R^{22}$ may be an alkyl group such as methyl, and subscript ii may have a value such that the hydroxyl functional polydiorganosiloxane has a viscosity of at least 100 mPa·s at 25° C. Alternatively, subscript ii may have a value ranging from 50 to 700. Exemplary hydroxyl-endblocked polydiorganosiloxanes are hydroxyl-endblocked polydimethylsiloxanes. Hydroxyl-endblocked polydiorganosiloxanes suitable for use as ingredient (A) may be prepared by methods known in the art, such as hydrolysis and condensation of the corresponding organohalosilanes or equilibration of cyclic polydiorganosiloxanes.

Ingredient (A) may further comprise polydimethylsiloxanes endblocked on one terminal end by a triorganosilyl group, e.g., $(CH_3)_3Si—$, and on the other end by a hydroxyl group. The polydiorganosiloxanes having both hydroxyl end groups and triorganosilyl end groups, may have more than 50%, alternatively more than 75%, of the total end groups as hydroxyl groups. The amount of triorganosilyl group in the polymer may be used to regulate the modulus of the resulting cured sealant. Without wishing to be bound by theory, it is thought that higher concentrations of triorganosilyl end groups provide a lower modulus in cured sealants.

Alternatively, ingredient (A) may comprise an alkoxysilylhydrocarbylene-endblocked polydiorganosiloxane, for example when in formula (XIII) above each $R^{23}$ is divalent hydrocarbon group or a combination of a divalent hydrocarbon group and a divalent siloxane group. $R^{23}$ may be an alkylene group such as ethylene, propylene, or hexylene; an arylene group such as phenylene, or an alkylarylene group such as:

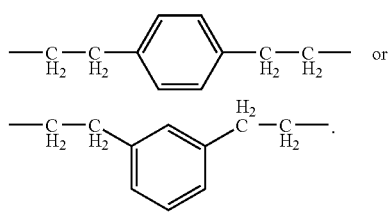

Alternatively, each $R^{32}$ and each $R^{23}$ may be alkyl, each $R^{23}$ may be ethylene, and hh may be 0.

Ingredient (A) can be a single base polymer or a combination comprising two or more base polymers that differ in at least one of the following properties: average molecular weight, siloxane units, sequence, and viscosity.

Alkoxysilylhydrocarbylene-endblocked polydiorganosiloxanes may be prepared by reacting a vinyl-terminated, polydimethylsiloxane with (alkoxysilylhydrocarbyl)tetramethyldisiloxane. Alkoxysilylhydrocarbylene-endblocked polydiorganosiloxanes are known in the art and are disclosed in U.S. Pat. Nos. 4,962,076; 5,051,455; and 5,053,442.

Ingredient (A) may further comprise an MQ resin, which comprises siloxane units of the formulae $R^{21}{}_{jj}R^{22}{}_{(3-jj)}SiO_{1/2}$ and $SiO_{4/2}$, where $R^{21}$ and $R^{22}$ are as described above and each subscript jj is 0, 1, or 2. The MQ resin may have a molar ratio of M units to Q units (M:Q) of 0.5 to 1.2. Methods of preparing MQ resins are known in the art. For example, a MQ resin may be prepared by treating a product produced by the silica hydrosol capping process of Daudt, et al. disclosed in U.S. Pat. No. 2,676,182. Briefly stated, the method of Daudt, et al. involves reacting a silica hydrosol under acidic conditions with a hydrolyzable triorganosilane such as trimethylchlorosilane, a siloxane such as hexamethyldisiloxane, or a combination thereof, and recovering a product comprising M and Q units (MQ resin). The resulting MQ resins may contain from 2 to 5 percent by weight of silicon-bonded hydroxyl groups.

Ingredient (B) Crosslinker

Ingredient (B) in the moisture cure package is a crosslinker added in an amount sufficient to cure the composition. The exact amount of ingredient (B) depends on various factors including the hydrolyzable substituents of ingredients (A) and (B), however, the amount of ingredient (B) may range from 0.5 to 15 parts based on 100 parts by weight of ingredient (A). Ingredient (B) may comprise a silane crosslinker having hydrolyzable groups or partial or full hydrolysis products thereof. Examples of suitable silane crosslinkers may have the general formula (XV) $R^4{}_cSi(R^5)_{4-c}R^{24}{}_{kk}Si(R^{25})_{4-kk}$, where each $R^{24}$ is independently a monovalent hydrocarbon group such as an alkyl group; each $R^{25}$ is a hydrolyzable substituent, for example a halogen atom, an acetamido group, an acyloxy group such as acetoxy, an alkoxy group, an amido group, an amino group, an aminoxy group, a hydroxyl group, an oximo group, a ketoximo group, or a methylacetamido group; and subscript kk is 0, 1, 2, or 3. Alternatively, each $R^{25}$ may be independently selected from hydroxyl, alkoxy, acetoxy, amide, or oxime. Alternatively, ingredient (B) may be selected from an acyloxysilane, an alkoxysilane, a ketoximosilane, and an oximosilane.

Ingredient (C) Catalyst

Ingredient (C) is a catalyst that may optionally be added to the cure package to accelerate curing. Ingredient (C) in the moisture cure package may comprise a carboxylic acid salt of metal, a tin compound, a titanium compound, or a zirconium compound.

Ingredient (C) may comprise carboxylic acid salts of metals, ranging from lead to manganese inclusive, in the electromotive series of metals. Alternatively, ingredient (C) may comprise a chelated titanium compound, a titanate such as a tetraalkoxytitanate, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate)diisopropoxy titanium (IV), and a combination thereof. Alternatively ingredient (C) may comprise a tin compound such as dibutyltin diacetate, dibutyltin dilaurate, dibutyl tin oxide, stannous octoate tin oxide, or a combination thereof. Examples of catalysts for moisture cure packages are disclosed in U.S. Pat. Nos. 4,962,076; 5,051,455; and 5,053,442.

These moisture cure packages are stable when the curable silicone compositions containing them are stored in containers that protect them from exposure to moisture, but the compositions cure rapidly when exposed to moisture.

Hydrosilylation Cure Packages

Alternatively, ingredient (i) in the composition may comprise a hydrosilylation cure package. The hydrosilylation cure package may comprise: 100 parts by weight of (A') a base polymer, an amount sufficient to cure the composition of (B') a crosslinking agent, and an amount sufficient to initiate curing of the composition of (C') a catalyst.

Ingredient (A) Base Polymer

Ingredient (A') of the hydrosilylation cure package may comprise a polyorganosiloxane having an average of at least two aliphatically unsaturated organic groups per molecule. Ingredient (A') may have a linear or branched structure. Ingredient (A') may be a homopolymer or a copolymer. The aliphatically unsaturated organic groups may be alkenyl exemplified by, but not limited to, vinyl, allyl, butenyl, and hexenyl. The unsaturated organic groups may be alkynyl groups exemplified by, but not limited to, ethynyl, propynyl, and butynyl. The aliphatically unsaturated organic groups in ingredient (A') may be located at terminal, pendant, or both terminal and pendant positions.

The remaining silicon-bonded organic groups in ingredient (A') may be monovalent organic groups free of aliphatic unsaturation. These monovalent organic groups may have 1 to 20 carbon atoms, alternatively 1 to 10 carbon atoms, and are exemplified by, but not limited to alkyl groups such as methyl, ethyl, propyl, pentyl, octyl, undecyl, and octadecyl; cycloalkyl groups such as cyclohexyl; and aromatic groups such as phenyl, tolyl, xylyl, benzyl, and 2-phenylethyl.

Ingredient (A') may comprise a polyorganosiloxane of formula

  (XVI)

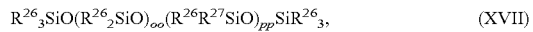  (XVII)

or a combination thereof.

In Formulae (XVI) and (XVII), each $R^{26}$ is independently a monovalent organic group free of aliphatic unsaturation, and each $R^{27}$ is independently an aliphatically unsaturated organic group, subscript mm has an average value ranging from 2 to 2000, subscript nn has an average value ranging from 0 to 2000, subscript oo has an average value ranging from 0 to 2000, and subscript pp has an average value ranging from 2 to 2000. Suitable monovalent organic groups for $R^{26}$ include, but are not limited to, alkyl such as methyl, ethyl, propyl, pentyl, octyl, undecyl, and octadecyl; cycloalkyl such as cyclohexyl; and aryl such as phenyl, tolyl, xylyl, benzyl, and 2-phenylethyl. Each $R^{27}$ is independently an aliphatically unsaturated monovalent organic group. $R^{27}$ is exemplified by alkenyl groups such as vinyl, allyl, and butenyl and alkynyl groups such as ethynyl and propynyl.

Ingredient (A') may comprise polydiorganosiloxanes such as i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylphenylsiloxane),
vii) dimethylvinylsiloxy-terminated poly(dimethylsiloxane/diphenylsiloxane),
viii) phenyl,methyl,vinyl-siloxy-terminated polydimethylsiloxane,
ix) dimethylhexenylsiloxy-terminated polydimethylsiloxane,
x) dimethylhexenylsiloxy-terminated poly(dimethylsiloxane/methylhexenylsiloxane),
xi) dimethylhexenylsiloxy-terminated polymethylhexenylsiloxane,
xii) trimethylsiloxy-terminated poly(dimethylsiloxane/methylhexenylsiloxane),
xiii) a combination thereof.

Methods of preparing polydiorganosiloxane fluids suitable for use as ingredient (A'), such as hydrolysis and condensation of the corresponding organohalosilanes or equilibration of cyclic polydiorganosiloxanes, are well known in the art.

Ingredient (A') may further comprise a resin such as an MQ resin consisting essentially of $R^{28}_3SiO_{1/2}$ units and $SiO_{4/2}$ units, a TD resin consisting essentially of $R^{28}SiO_{3/2}$ units and $R^{28}_2SiO_{2/2}$ units, an MT resin consisting essentially of $R^{28}_3SiO_{1/2}$ units and $R^{28}SiO_{3/2}$ units, an MTD resin consisting essentially of $R^{28}_3SiO_{1/n}$ units, $R^{28}SiO_{3/2}$ units, and $R^{28}_2SiO_{2/2}$ units, or a combination thereof.

Each $R^{28}$ is a monovalent organic group. The monovalent organic groups represented by $R^{28}$ may have 1 to 20 carbon atoms. Examples of monovalent organic groups include, but are not limited to, monovalent unsubstituted hydrocarbon groups and monovalent halogenated hydrocarbon groups. Monovalent unsubstituted hydrocarbon groups include, but are not limited to, alkyl such as methyl, ethyl, propyl, pentyl, octyl, undecyl, and octadecyl; cycloalkyl such as cyclohexyl; alkenyl such as vinyl, allyl, butenyl, and hexenyl; alkynyl such as ethynyl, propynyl, and butynyl; and aryl such as phenyl, tolyl, xylyl, benzyl, and 2-phenylethyl.

The resin may contain an average of 3 to 30 mole percent of aliphatically unsaturated organic groups. The aliphatically unsaturated organic groups may be alkenyl groups, alkynyl groups, or a combination thereof. The mole percent of aliphatically unsaturated organic groups in the resin is the ratio of the number of moles of unsaturated group-containing siloxane units in the resin to the total number of moles of siloxane units in the resin, multiplied by 100.

Methods of preparing resins are well known in the art. The method of Daudt, et al. is described above. The resin used here may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355;

4,591,622; and 4,585,836. A single endblocking agent or a mixture of such agents may be used to prepare the resin.

Ingredient (A') can be a single base polymer or a combination comprising two or more base polymers that differ in at least one of the following properties: structure, viscosity, average molecular weight, siloxane units, and sequence.

Ingredient (B) Organohydrogenpolysiloxane

Ingredient (B') in the hydrosilylation cure package is an organohydrogenpolysiloxane having an average of at least two silicon-bonded hydrogen atoms per molecule. The amount of ingredient (B') in the hydrosilylation cure package may range from 0.5 to 15 parts per 100 parts by weight of ingredient (A'). Ingredient (B') can be can be a homopolymer or a copolymer. Ingredient (B') can have a linear, branched, cyclic, or resinous structure. The silicon-bonded hydrogen atoms in ingredient (B') can be located at terminal, pendant, or at both terminal and pendant positions.

Ingredient (B') may comprise siloxane units including, but not limited to, $HR^{29}_2SiO_{1/2}$, $R^{29}_3SiO_{1/2}$, $HR^{29}SiO_{2/2}$, $R^{29}_2SiO_{2/2}$, $R^{29}SiO_{3/2}$, and $SiO_{4/2}$ units. In the preceding formulae, each $R^{29}$ is independently selected from monovalent organic groups free of aliphatic unsaturation.

Ingredient (B') may comprise a compound of the formula

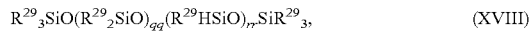

$$R^{29}_3SiO(R^{29}_2SiO)_{qq}(R^{29}HSiO)_{rr}SiR^{29}_3, \quad (XVIII)$$

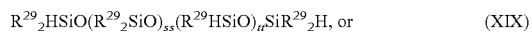

$$R^{29}_2HSiO(R^{29}_2SiO)_{ss}(R^{29}HSiO)_{tt}SiR^{29}_2H, \text{ or} \quad (XIX)$$

a combination thereof.

In formulae above, subscript qq has an average value ranging from 0 to 2000, subscript rr has an average value ranging from 2 to 2000, subscript ss has an average value ranging from 0 to 2000, and subscript tt has an average value ranging from 0 to 2000. Each $R^{29}$ is independently a monovalent organic group. Suitable monovalent organic groups include alkyl such as methyl, ethyl, propyl, pentyl, octyl, undecyl, and octadecyl; cycloalkyl such as cyclohexyl; alkenyl such as vinyl, allyl, butenyl, and hexenyl; alkynyl such as ethynyl, propynyl, and butynyl; and aryl such as phenyl, tolyl, xylyl, benzyl, and 2-phenylethyl.

Ingredient (B') is exemplified by
a) dimethylhydrogensiloxy-terminated polydimethylsiloxane,
b) dimethylhydrogensiloxy-terminated poly(dimethylsiloxane/methylhydrogensiloxane),
c) dimethylhydrogensiloxy-terminated polymethylhydrogensiloxane,
d) trimethylsiloxy-terminated poly(dimethylsiloxane/methylhydrogensiloxane),
e) trimethylsiloxy-terminated polymethylhydrogensiloxane,
f) a resin consisting essentially of $H(CH_3)_2SiO_{1/2}$ units and $SiO_{4/2}$ units, and
g) a combination thereof.

Ingredient (B') may be a single organohydrogenpolysiloxane or a combination comprising two or more organohydrogenpolysiloxanes that differ in at least one of the following properties: structure, average molecular weight, viscosity, siloxane units, and sequence. Ingredient (B') may be added in an amount ranging from 0.4 to 20% based on the weight of the hydrosilylation cure package.

Methods of preparing linear, branched, and cyclic organohydrogenpolysiloxanes suitable for use as ingredient (B'), such as hydrolysis and condensation of organohalosilanes, are well known in the art. Methods of preparing organohydrogenpolysiloxane resins suitable for use as ingredient (B') are also well known as exemplified in U.S. Pat. Nos. 5,310, 843; 4,370,358; and 4,707,531.

Ingredient (C) Hydrosilylation Catalyst

Ingredient (C') of the hydrosilylation cure package is a hydrosilylation catalyst. Ingredient (C') is added to the hydrosilylation cure package in an amount of 0.1 to 1000 ppm of platinum group metal, alternatively 1 to 500 ppm, alternatively 2 to 200, alternatively 5 to 150 ppm, based on the weight of the curable silicone composition.

Suitable hydrosilylation catalysts are known in the art and commercially available. Ingredient (C') may comprise a platinum group metal selected from platinum, rhodium, ruthenium, palladium, osmium or iridium metal or organometallic compound thereof, or a combination thereof. Ingredient (C') is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04 to 0.4% based on the weight of the curable silicone composition.

Suitable hydrosilylation catalysts for ingredient (C') are described in, for example, U.S. Pat. Nos. 3,159,601; 3,220, 972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. No. 4,766,176; and U.S. Pat. No. 5,017,654.

One skilled in the art would be able to select suitable treating agents to go in each cure system. For example, one skilled in the art would recognize that an aminoethylaminopropyl functional polyorganosiloxane treating agent, and a filler treated therewith, would act as an inhibitor for a hydrosilylation cure package.

Peroxide Cure Packages

Alternatively, ingredient (i) may comprise a peroxide cure package. The peroxide cure package may comprise: 100 parts by weight of (A") a base polymer, optionally an amount sufficient to cure the composition of (B") a crosslinking agent, and an amount sufficient to accelerate curing of the composition of (C") a catalyst.

Ingredient (A") Base Polymer

Ingredient (A") of the peroxide cure package comprises a polydiorganosiloxane having an average of at least two aliphatically unsaturated organic groups per molecule. The polydiorganosiloxane may have a viscosity of at least 100 mPa·s at 25° C. The polydiorganosiloxane may comprise a polydiorganosiloxane gum having a viscosity, measured as Williams Plasticity Number in accordance with ASTM D-962 of greater than 100, which is equivalent to $4 \times 10^6$ mPa·s at 25° C. Alternatively, viscosity may range from 125 to 200 Williams Plasticity number (corresponding to $10 \times 10^6$ to $80 \times 10^6$ mPa·s at 25° C.).

The aliphatically unsaturated organic groups may be alkenyl exemplified by, but not limited to, vinyl, allyl, butenyl, and hexenyl. The aliphatically unsaturated organic groups may be alkynyl groups exemplified by, but not limited to, ethynyl, propynyl, and butynyl. The unsaturated organic groups in ingredient (A") may be located at terminal, pendant, or both terminal and pendant positions.

The remaining silicon-bonded organic groups in ingredient (A'") may be monovalent organic groups free of aliphatic unsaturation. These monovalent organic groups are exemplified by, but not limited to alkyl groups such as methyl, ethyl, propyl, pentyl, octyl, undecyl, and octadecyl; cycloalkyl groups such as cyclohexyl; and aromatic groups such as phenyl, tolyl, xylyl, benzyl, and 2-phenylethyl.

Ingredient (A") may comprise a polydiorganosiloxane of formula

$$R^{30}{}_2R^{31}SiO(R^{30}{}_2SiO)_{uu}(R^{30}R^{31}SiO)_{vv}SiR^{30}{}_2R^{31}, \quad (XX)$$

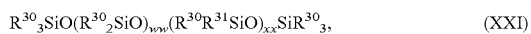

$$R^{30}{}_3SiO(R^{30}{}_2SiO)_{ww}(R^{30}R^{31}SiO)_{xx}SiR^{30}{}_3, \quad (XXI)$$

or a combination thereof.

In formulae (XX) and (XXI), each $R^{30}$ is independently a monovalent organic group free of aliphatic unsaturation, each $R^{31}$ is independently an aliphatically unsaturated organic group, subscript uu has an average value of at least 2, subscript vv may be 0 or a positive number, subscript ww may be 0 or a positive number, and subscript xx has an average value of at least 2, with the proviso that the subscripts have values sufficient to give the polydiorganosiloxanes of formulae (XX) and (XXI) Williams Plasticity Numbers greater than 100. Suitable monovalent organic groups for $R^{30}$ include, but are not limited to, alkyl such as methyl, ethyl, propyl, pentyl, octyl, undecyl, and octadecyl; cycloalkyl such as cyclohexyl; and aryl such as phenyl, tolyl, xylyl, benzyl, and 2-phenylethyl. Each $R^{31}$ is independently an aliphatically unsaturated monovalent organic group. $R^{31}$ is exemplified by alkenyl groups such as vinyl, allyl, and butenyl and alkynyl groups such as ethynyl and propynyl.

Ingredient (A") may be a single polydiorganosiloxane or a combination comprising two or more polydiorganosiloxanes that differ in at least one of the following properties: structure, average molecular weight, viscosity, siloxane units, and sequence.

Optional Ingredient (B") Crosslinking Agent

Ingredient (B") a crosslinking agent may optionally be added to the peroxide cure package to improve compression set of a silicone elastomer prepared by curing this composition. The amount of ingredient (B") in the composition may range from 0 to 15 parts per 100 parts by weight of ingredient (A"). Ingredient (B") may comprise a polydiorganohydrogensiloxane having an average of at least two silicon-bonded hydrogen atoms per molecule.

Ingredient (B") may comprise a polydiorganohydrogensiloxane of the formula

$$R^{32}{}_3SiO(R^{32}{}_2SiO)_{yy}(R^{32}HSiO)_{zz}SiR^{32}{}_3, \quad (XXII)$$

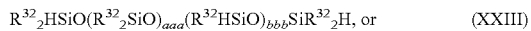

$$R^{32}{}_2HSiO(R^{32}{}_2SiO)_{aaa}(R^{32}HSiO)_{bbb}SiR^{32}{}_2H, \text{ or} \quad (XXIII)$$

a combination thereof.

In formulae above, subscript yy has an average value ranging from 0 to 2000, subscript zz has an average value ranging from 2 to 2000, subscript aaa has an average value ranging from 0 to 2000, and subscript bbb has an average value ranging from 0 to 2000, with the provisos that the quantity (yy+zz)<2000, and the quantity (aaa+bbb)<2000. Each $R^{32}$ is independently a monovalent organic group. Suitable monovalent organic groups include alkyl such as methyl, ethyl, propyl, pentyl, octyl, undecyl, and octadecyl; cycloalkyl such as cyclohexyl; alkenyl such as vinyl, allyl, butenyl, and hexenyl; alkynyl such as ethynyl, propynyl, and butynyl; and aryl such as phenyl, tolyl, xylyl, benzyl, and 2-phenylethyl.

Ingredient (B") is exemplified by
i) dimethylhydrogensiloxy-terminated polydimethylsiloxane,
ii) dimethylhydrogensiloxy-terminated poly(dimethylsiloxane/methylhydrogensiloxane),
iii) dimethylhydrogensiloxy-terminated polymethylhydrogensiloxane,
iv) trimethylsiloxy-terminated poly(dimethylsiloxane/methylhydrogensiloxane),
v) trimethylsiloxy-terminated polymethylhydrogensiloxane,
vi) a combination thereof.

Ingredient (B") may be a single polydiorganohydrogensiloxane or a combination comprising two or more polydiorganohydrogensiloxanes that differ in at least one of the following properties: structure, average molecular weight, viscosity, siloxane units, and sequence.

Ingredient (C") Catalyst

Ingredient (C") in the peroxide cure package comprises a peroxide compound. The amount of ingredient (C") added to the composition depends on the specific peroxide compound selected for ingredient (C"), however, the amount may range from 0.2 to 5 parts per 100 parts by weight of ingredient (A"). Examples of peroxide compounds suitable for ingredient (C") include, but are not limited to, 2,4-dichlorobenzoyl peroxide, dicumyl peroxide, and a combination thereof; as well as combinations of such a peroxide with a benzoate compound such as tertiary-butyl perbenzoate.

Suitable peroxide cure packages are known in the art, and are disclosed in, for example, U.S. Pat. No. 4,774,281.

Radiation Cure Package

Alternatively, ingredient (i) in the composition may comprise a radiation cure package. The radiation cure package may comprise: 100 parts by weight of (A''') a base polymer, optionally (B''') a crosslinking agent, and an amount sufficient to initiate curing of the composition of (C''') a photoinitiator.

Ingredient (A''') of the radiation cure package may comprise a polyorganosiloxane having an average of at least two radiation curable organic groups per molecule. Ingredient (A''') may have a linear or branched structure. Ingredient (A''') may be a homopolymer or a copolymer. Suitable radiation curable groups include (meth)acrylate functional groups and epoxy functional groups. Suitable (meth)acrylate functional groups include acryloxy, methacryloxy, acrylamide, and methacrylamide. Alternatively, each J may be an epoxy functional group. Examples of suitable epoxy functional groups include 3,4-epoxycyclohexyl; epoxyethyl(oxiranyl); epoxymethyl; glycidoxy; glycidoxyalkyl such as glycidoxymethyl, 2-glycidoxyethyl, 3-glycidoxypropyl and 4-glycidoxybutyl; epoxycyclohexylalkyl groups such as 4-methyl-3,4-epoxycyclohexyl, 2-(3,4-epoxycyclohexyl) ethyl, 3-(3,4-epoxycyclohexyl)propyl, 3,4-epoxy-4-methyl-cylohexyl, 2,3-epoxycylopentyl, and (2,3-epoxycylopentyl) methyl; and oxiranylalkyl such as 4-oxiranylbutyl and 8-oxiranyloctyl.

Alternatively, each J may be a cycloaliphatic epoxy functional group. Examples of cycloaliphatic epoxy functional groups include:

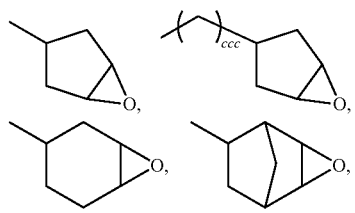

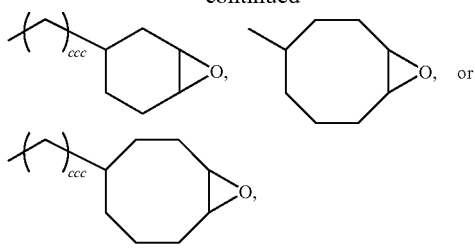

where each subscript ccc independently has a value ranging from 1 to 5. The radiation curable organic groups in ingredient (A''') may be located at terminal, pendant, or both terminal and pendant positions.

The remaining silicon-bonded organic groups in ingredient (A''') may be monovalent organic groups free of aliphatic unsaturation. These monovalent organic groups may have 1 to 20 carbon atoms, alternatively 1 to 10 carbon atoms, and are exemplified by, but not limited to alkyl groups such as methyl, ethyl, propyl, pentyl, octyl, undecyl, and octadecyl; cycloalkyl groups such as cyclohexyl; and aromatic groups such as phenyl, tolyl, xylyl, benzyl, and 2-phenylethyl. Ingredient (A''') may be a single polyorganosiloxane or a combination of two or more polyorganosiloxanes that differ in at least one property selected from structure, viscosity, average molecular weight, siloxane units, and sequence.

Ingredient (C'''), the photoinitiator, may be any conventional photoinitiator for radiation curable silicone compositions known in the art, such as those disclosed in U.S. Pat. Nos. 4,310,469 to Crivello and 4,313,988 to Koshar, et al. and European Patent Application No. EP 0 562 922. The photoinitiator may comprise a cationic photoinitiator. The cationic photoinitiator can be any cationic photoinitiator capable of initiating cure (cross-linking) of the polymer upon exposure to radiation having a wavelength ranging from 150 to 800 nm. Examples of cationic photoinitiators include, but are not limited to, onium salts.

Suitable onium salts include salts having a formula selected from $R^{33}_2I^+MG_{ddd}^-$, $R^{33}_3S^+MG_{ddd}^-$, $R^{33}_3Se^+MG_{ddd}^-$, $R^{33}_4P^+MG_{ddd}^-$, and $R^{33}_4N^+MG_{ddd}^-$, where each $R^{33}$ is independently a substituted or unsubstituted monovalent hydrocarbon group having from 1 to 30 carbon atoms; M is an element selected from transition metals, rare earth metals, lanthanide metals, metalloids, phosphorus, and sulfur; G is a halo (e.g., chloro, bromo, iodo), and subscript ddd has a value such that the product ddd (charge on G+oxidation number of M)=−1. Examples of substituents on the substituted hydrocarbon group include, but are not limited to, alkoxy groups of 1 to 8 carbon atoms, alkyl groups of 1 to 16 carbon atoms, nitro, chloro, bromo, cyano, carboxyl, mercapto, and heterocyclic aromatic groups, such as pyridyl, thiophenyl, and pyranyl. Examples of metals represented by M include, but are not limited to, transition metals, such as Fe, Ti, Zr, Sc, V, Cr, and Mn; lanthanide metals, such as Pr, and Nd; other metals, such as Cs, Sb, Sn, Bi, Al, Ga, and In; metalloids, such as B, and As; and P. The formula $MG_{ddd}^-$ represents a non-basic, non-nucleophilic anion. Examples of anions having the formula $MG_{ddd}^-$ include, but are not limited to, $BF_4^-$, $PF_6^-$, $AsF_6^-$, $SbF_6^=$, $SbCl_6^-$, and $SnCl_6^-$.

Examples of onium salts include, but are not limited to, bis-diaryliodonium salts such as bis(dodecylphenyl)iodonium salts exemplified by bis(dodecyl phenyl)iodonium hexafluoroarsenate and bis(dodecylphenyl)iodonium hexafluoroantimonate; alkylphenyliodonium salts such as alkylphenyliodonium hexafluoroantimonate; diaryliodonium salts of sulfonic acids, triarylsulfonium salts of sulfonic acids, diaryliodonium salts of boronic acids, and triarylsulfonium salts of boronic acids.

Examples of diaryliodonium salts of sulfonic acids include, but are not limited to, diaryliodonium salts of perfluoroalkylsulfonic acids, such as diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethanesulfonic acid; and diaryliodonium salts of aryl sulfonic acids, such as diaryliodonium salts of para-toluenesulfonic acid, diaryliodonium salts of dodecylbenzenesulfonic acid, diaryliodonium salts of benzenesulfonic acid, and diaryliodonium salts of 3-nitrobenzenesulfonic acid.

Examples of triarylsulfonium salts of sulfonic acids include, but are not limited to, triarylsulfonium salts of perfluoroalkylsulfonic acids, such as triarylsulfonium salts of perfluorobutanesulfonic acid, triarylsulfonium salts of perfluoroethanesulfonic acid, triarylsulfonium salts of perfluorooctanesulfonic acid, and triarylsulfonium salts of trifluoromethanesulfonic acid; and triarylsulfonium salts of aryl sulfonic acids, such as triarylsulfonium salts of para-toluenesulfonic acid, triarylsulfonium salts of dodecylbenzenesulfonic acid, triarylsulfonium salts of benzenesulfonic acid, and triarylsulfonium salts of 3-nitrobenzenesulfonic acid.

Examples of diaryliodonium salts of boronic acids include, but are not limited to, diaryliodonium salts of perhaloarylboronic acids. Examples of triarylsulfonium salts of boronic acids include, but are not limited to, triarylsulfonium salts of perhaloarylboronic acid.

The cationic photoinitiator can be a single cationic photoinitiator or a combination comprising two or more different cationic photoinitiators, each as described above. The concentration of the cationic photoinitiator may range from 0.01% to 15%, based on the weight of the composition.

One skilled in the art would recognize that the composition may comprise more than one cure package. For example a dual cure package that is both moisture curable and hydrosilylation curable may be used. One skilled in the art would be able to select ingredients and amounts thereof in each cure package described above to prepare a cured product that has a desired consistency, such as a rubber or gel.

Filler

Ingredient (ii) of the composition is an inorganic filler. Ingredient (ii) may comprise a reinforcing filler, an extending filler, a conductive filler, or a combination thereof. Alternatively, ingredient (ii) may comprise a filler that is both thermally conductive and electrically conductive. Alternatively, ingredient (ii) may be thermally conductive and electrically insulating.

Examples of suitable reinforcing fillers include mica, silica, titanium dioxide, and combinations thereof. Examples of suitable reinforcing fillers include reinforcing silica fillers such as fume silica, silica aerogel, silica zerogel, and precipitated silica. Fumed silicas are known in the art and commercially available; fumed silica sold under the name CAB-O-SIL by Cabot Corporation of Massachusetts.

Examples of extending fillers include crushed quartz, aluminum oxide, magnesium oxide, calcium carbonate, zinc oxide, talc, diatomaceous earth, iron oxide, clays, titanium dioxide, zirconia, sand, or a combination thereof. Extending fillers are known in the art and commercially available; such as a ground silica sold under the name MIN-U-SIL by U.S. Silica of Berkeley Springs, W. Va.

Alternatively, ingredient (ii) may comprise a metallic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, palladium, platinum, silver, and alloys thereof. Alternatively, the metallic filler may be aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Alternatively, the filler may be an electrically conductive filler comprising particles having at least an outer surface of a metal such as those described above, on a core. The core of such particles can be any material, electrical conductor or insulator, which supports a surface consisting of the aforementioned metal and does not adversely affect the electrical properties of the composition or of a cured product thereof. Examples of such materials include, but are not limited to, copper, solid glass, hollow glass, mica, nickel, and ceramic fiber.

Inorganic fillers are exemplified by aluminum oxide, beryllium oxide, boron nitride, magnesium oxide, silicon carbide, tungsten carbide, zinc oxide, and combinations thereof. Alternatively, inorganic fillers are exemplified by aluminum oxide, zinc oxide, and combinations thereof.

Meltable fillers may comprise Ga, In, Sn, or an alloy thereof. The meltable filler may optionally further comprise Ag, Bi, Cd, Cu, Pb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point of up to 250° C., alternatively up to 225° C. The meltable filler may have a melting point of at least 50° C., alternatively at least 150° C. The meltable filler may be a eutectic alloy, a non-eutectic alloy, or a pure metal. Meltable fillers are commercially available.

Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A.

Conductive fillers are known in the art and commercially available, see for example, U.S. Pat. No. 6,169,142 (col. 4, lines 7-33). For example, CB-A20S and Al-43-Me are aluminum oxide fillers of differing particle sizes commercially available from Showa-Denko, and AA-04, AA-2, and AA18 are aluminum oxide fillers commercially available from Sumitomo Chemical Company. Zinc oxides, such as zinc oxides having trademarks KADOX® and XX®, are commercially available from Zinc Corporation of America of Monaca, Pa., U.S.A.

The shape of the filler particles is not specifically restricted, however, rounded or spherical particles may prevent viscosity increase to an undesirable level upon high loading of the conductive filler in the composition.

Ingredient (ii) may be a single filler or a combination of two or more fillers that differ in at least one property such as particle shape, average particle size, particle size distribution, and type of filler. For example, it may be desirable to use a combination of inorganic fillers, such as a first aluminum oxide having a larger average particle size and a second aluminum oxide having a smaller average particle size. Alternatively, it may be desirable, for example, use a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. Alternatively, it may be desirable to use combinations of metallic and inorganic fillers, such as a combination of aluminum and aluminum oxide fillers; a combination of aluminum and zinc oxide fillers; or a combination of aluminum, aluminum oxide, and zinc oxide fillers. Use of a first filler having a larger average particle size and a second filler having a smaller average particle size than the first filler may improve packing efficiency, may reduce viscosity, and, for thermally conductive fillers, may enhance heat transfer.

The average particle size of the filler will depend on various factors including the type of filler selected for ingredient (ii) and the exact amount added to the composition. However, a conductive filler may have an average particle size of 0.1 to 80 micrometers, alternatively 0.1 to 50 micrometers, and alternatively 0.1 to 10 micrometers.

The amount of filler in the composition depends on various factors including the types of matrix and the type of filler selected, the type and amount of filler treating agent, and the end use of the composition. However, the composition may contain 1% to 98% parts of filler based on the weight of the composition.

One skilled in the art would recognize that some types of filler overlap with one another. For example, zinc oxide may be both a conductive and an extending filler. One skilled in the art would be able to select an appropriate type and amount of filler to formulate the desired composition.

Filler Treating Agent

The filler treating agent comprises the polyorganosiloxane capable of hydrogen bonding described above. The polyorganosiloxane capable of hydrogen bonding has an average, per molecule, of at least one silicon-bonded group capable of hydrogen bonding where the group may be selected from: an organic group having at least one saccharide functional group or an organic group having at least one amino functional group. The polyorganosiloxane capable of hydrogen bonding may be selected from the group consisting of a saccharide-siloxane polymer, an amino-functional polyorganosiloxane, and a combination thereof. Alternatively, the filler treating agent may be a saccharide-siloxane polymer. The amount of filler treating agent in the composition depends on various factors including the end use of the composition, the type and amount of filler selected, and the method for treating the filler used. However, the amount of filler treating agent may range from 0.1% to 10%, alternatively 0.1% to 5% based on the weight of the filler.

Alternatively, ingredients (i) and (iii) may be the same. For example, when the composition is a grease composition, (iii) the filler treating agent may be used as (i) the matrix. For example, the saccharide-siloxane polymer described above may be used as the matrix for a thermally conductive filler.

Additional Ingredients

The composition of this invention may further comprise one or more additional ingredients in addition to ingredients (i), (ii), and (iii). The composition may further comprise an additional ingredient selected from the group consisting of (iv) a stabilizer (e.g., a hydrosilylation cure stabilizer, a heat stabilizer, or a UV stabilizer), (v) a plasticizer, (vi), an extender (sometimes referred to as a secondary plasticizer or processing aid), (vii) an adhesion promoter, (viii) a fungicide, (ix) a rheological additive, (x) a flame retardant, (xi) a pigment, and a combination thereof.

Ingredient (iv) is a stabilizer. Stabilizers for hydrosilylation cure packages are exemplified by acetylenic alcohols such as methyl butynol, ethynyl cyclohexanol, dimethyl hexynol, 1,1-dimethyl-2-propynyl)oxy)trimethylsilane, methyl(tris(1, 1-dimethyl-2-propynyloxy))silane, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines such as tetramethyl ethylenediamine, dialkyl fumarates, dialkenyl fumarates, dialkoxyalkyl fumarates, maleates such as diallyl maleate, and a combination thereof. Alternatively, the stabilizer may comprise phenyl butynol. Suitable hydrosilylation cure package stabilizers are disclosed by, for example, U.S. Pat. Nos. 3,445,420; 3,989,667; 4,584,361; and 5,036,117.

The amount of stabilizer added to the curable silicone composition will depend on the particular stabilizer used and the composition and amount of catalyst. However, the amount of hydrosilylation cure package stabilizer may range from 0.0025% to 0.025% based on the weight of the curable silicone composition.

Method for Preparing the Composition

The composition may be prepared by any convenient means. For example, a method for preparing the composition comprises: (1) combining ingredients comprising (i) a matrix, (ii) a conductive filler, and (iii) the filler treating agent described above, thereby treating the filler with the filler treating agent in situ, and optionally (2) curing the composition, when a curable matrix is used. One or more additional ingredients may optionally be added in step (1).

Alternatively, the composition may be prepared by pretreating (ii) the filler with (iii) the filler treating agent before combining the resulting pretreated filler with the (i) matrix and one or more additional ingredients, if any. For example, a method for preparing the composition comprises (1) mixing (ii) the filler with a solvent solution of (iii) the filler treating agent, (2) mixing the product of step (1) with (i) the matrix, and optionally (3) removing the solvent. One or more of the additional ingredients described above may be added during step (1) or step (2). The method may optionally further comprise (3) curing the composition, when a curable matrix is used.

Alternatively, a method for preparing the composition comprises (1) mixing (ii) the filler with a solvent solution of (iii) the filler treating agent, (2) removing the solvent, and (3) mixing the product of step (2) with (i) the matrix. One or more additional ingredients may be added during step (1) or step (3). The method may optionally further comprise (4) curing the composition, when a curable matrix is used. One skilled in the art would recognize that the process for preparing the treated filler may be performed using nonaqueous solvents. Without wishing to be bound by theory, it is thought that the presence of water may be detrimental to the process for treating the filler.

Uses of the Composition

The composition may be used in various applications. When the composition or a cured product thereof is thermally conductive, the composition may be used in a TIM application in an electronic device. FIG. 6 shows a device 600 including TIMs (602, 606) fabricated from a composition containing a thermally conductive filler treated with a filler treating agent as described above. The device 600 comprises an electronic component (shown as an integrated circuit (IC) chip) 603 mounted to a substrate 604 through a die attach adhesive 609. The substrate 604 has solder balls 605 attached thereto through pads 610. A first thermal interface material (TIM1) 606 is interposed between the IC chip 603 and a metal cover 607. The metal cover 607 acts as a first heat spreader. A second thermal interface material (TIM2) 602 is interposed between the metal cover 607 and a heat sink (second heat spreader) 301. Heat moves along a thermal path represented by arrows 608 when the device is operated. A variety of TIM product forms may be prepared using the compositions described herein, such as adhesives, greases, phase change compositions, pottants, precured elastomeric pads, and sealants.

EXAMPLES

The following examples are included to illustrate the invention to one of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. The amino-functional polyodimethylsiloxanes in Table 1 were used in the following examples.

TABLE 1

| | | Amino-functional Polyorganosiloxane Characteristics | | | | |
|---|---|---|---|---|---|---|
| Label | Functionality | Viscosity (centiStokes, cSt) | Mw | Mole % $NH_2$ | Theory DP | Mole % functional |
| A1 | $H_2NPrMe_2Si$— | 20-30 | 950 | 3.1 | 11 | |
| A2 | $H_2NPrMe_2Si$— | 100-120 | 5000 | 0.65 | 66 | |
| A3 | $H_2NEtHNPrMeSi$= | 150-250 | 7800 | | 100 | 2.3 |
| A4 | $H_2NEtHNPrMeSi$= | 1000 | 23000 | | 300 | 1.9 |

Saccharide-siloxane polymer treating agents were prepared by reacting the amino-functional polydimethylsiloxanes in Table 1 with either gluconolactone (GL) or lactobionolactone (LBL) in a 1:1 primary amine:lactone molar ratio to form saccharide-siloxane polymers. The reaction product of the amino-functional polydimethylsiloxane and gluconolactone is designated A1-GL, A2-GL, A3-GL, or A4-GL (depending on which amino-functional polydimethylsiloxane is used). The reaction product of the amino-functional polydimethylsiloxane and lactobionolactone is designated A1-LBL, A2-LBL, A3-LBL, or A4-LBL (depending on which amino-functional polydimethylsiloxane is used).

The filler used in the following examples was aluminum oxide. A mixture of 70 parts DAM10 having diameter ($D_{50}$) of 10 micrometers (μm) and 30 parts AA-04 from Showa Denko having diameter ($D_{50}$) of 0.4 μm was used.

Reference Example 1

Solutions were prepared by dispersing a treating agent in isopropanol (IPA) at a level of 1%. To yield 1% pretreated filler, 32 g of a solution and 32 g of the filler were combined and mixed for 30 seconds. Thereafter, the IPA was removed. To yield 0.3% pretreated filler 9.6 g of the 1% solution, 22.4 g IPA, and 32 g of the filler were combined, and thereafter the IPA was removed.

As comparative examples, the same procedure was completed with IPA containing no treatment or with a polyorganosiloxane of formula $M^{Vi}D^{Me}{}_{25}Si(OMe)_3$ as the treating agent.

Dispersion Sample Preparation and Evaluation

The pretreated fillers were dispersed in 20 cSt polydimethylsiloxane fluid at an aluminum oxide solids content of 90% by weight filler (69% by volume) in a 1 ounce Hauschild mixing cup with 30 seconds of mixer shear. Rheology was monitored by a frequency sweep at 0.1% and 1% strain, 25 mm parallel plates, at 25° C., immediately after dispersion and after aging 12 to 13 days at ambient temperature. Also, the pretreated filler, toluene extracted pretreated filler, toluene extracted filler from the initial dispersion and toluene extracted filler from the aged dispersion were analyzed by DRIFTS for bound polymer/treatment content.

DRIFTS Results:

After aging a dispersion, there was 0.2% to 0.4% bound content on the filler surface for all samples except the untreated control which contained 0.08% bound content, so it was concluded that the filler treatments were sticking to the surface, see Table 2. Bound content is defined as a combination of bound polymer and bound treatment since there is no easy way to distinguish using this technique. The extracted fillers were prepared for DRIFTS analysis by extracting 1 g of dispersion with 20 g of toluene, centrifugation of the filler and decanting the toluene, then repeating the procedure. After the last extraction, the filler was dried in a vacuum desiccator overnight at ambient temperature before analysis.

Rheology Results:

In general, lower viscosity (Eta*) allows higher aluminum oxide loading, which improves thermal performance. In the samples prepared above, there was quite a range for Eta*. However, in these samples, the use of a polyorganosiloxane capable of hydrogen bonding as a filler treating agent, e.g., amino-functional polyorganosiloxane or carbohydrate-functional polyorganosiloxane, can be more effective at controlling rheology than certain known treating agents such as $M^{Vi}D^{Me}{}_{25}Si(OMe)_3$. Without wishing to be bound by theory, it is thought that these examples indicate that hydrogen bonding is an adequate attachment for a surface treatment, see Table 2 and FIGS. 1 to 4.

Furthermore, it is thought that the hydrogen bonding of the saccharide-siloxane polymer provides further benefits upon additional shear. After ambient aging the dispersions for 4 weeks, Eta* was measured and the dispersions were remixed in a Hauschild centrifugal mixed for 5 minutes total (5 times for 60 s) before again measuring Eta*. An overlay of the frequency sweeps at 0.1% strain is shown in FIG. 5. Without wishing to be bound by theory, it is thought that the saccharide-siloxane polymers made the dispersions less susceptible to shear thickening, as shown with no apparent increase with treatments B and F, a very modest increase with treatment D and a much larger, almost 2 orders of magnitude, increase with the comparative sample using $M^{Vi}D^{Me}{}_{25}Si(OMe)_3$ as the filler treating agent. Upon increasing the filler loading, the saccharide-siloxane polymers were still effective in lowering Eta*, see Table 2.

TABLE 2

Saccharide-Siloxane Polymers, Amino-functional Polyorganosiloxane and Comparative Materials Evaluated As Aluminum oxide Surface Treatments and the Viscosity of a Dispersion Initially and After 12-13 Days Ambient Aging.

| Designation, % Wt. Filler | Treatment, level (%) | Aged Eta* (P), bound content (%) | Initial Eta* (P), bound content (%) | Extracted Powder (%) | Pretreated Powder (%) |
|---|---|---|---|---|---|
| Control*, 90% | None | 1.7E+08, 0.08 | 6.2E+07, 0.09 | 0.06 | 0.04 |
| A, 90% | A1-LBL, 0.3 | 5.1E+07, 0.27 | 1.8E+08, 0.52 | 0.35 | 0.35 |
| B, 90% | A3-GL, 1 | 4.8E+04, 0.29 | 8.8E+05, 0.25 | 0.33 | 1.06 |
| B, 90% | A3-GL, 0.3 | 6.3E+07, 0.27 | 1.8E+08, 0.23 | 0.39 | 0.41 |
| C, 90% | A2-GL, 1 | 3.1E+07, 0.39 | 1.5E+08, 0.68 | 0.59 | 0.90 |
| C, 90% | A2-GL, 0.3 | 1.4E+08, 0.37 | 2.3E+08, 0.31 | 0.36 | 0.38 |
| D, 90% | A2-LBL, 1 | 1.1E+05, 0.26 | 2.6E+06, 0.32 | 0.27 | 0.80 |
| D, 90% | A2-LBL, 0.3 | 1.3E+08, 0.30 | 5.0E+08, 0.38 | 0.32 | 0.35 |
| E, 90% | A1-GL, 1 | 1.2E+08, 0.82 | 1.9E+08, 0.81 | 0.79 | 0.70 |
| E, 90% | A1-GL, 0.3 | 3.6E+08, 0.23 | 9.5E+08, 0.32 | 0.35 | 0.33 |
| F, 90% | A3-LBL, 1 | 6.7E+03, 0.22 | 1.6E+06, 0.36 | 0.34 | 1.08 |
| G*, 90% | $M^{Vi}D^{Me}{}_{25}Si(OMe)_3$, 1 | 3.1E+05, 0.27 | 1.1E+07, 0.27 | 0.33 | 1 standard |
| G*, 90% | $M^{Vi}D^{Me}{}_{25}Si(OMe)_3$, 0.3 | 3.6E+07, 0.48 | 5.3E+07, 0.36 | 0.24 | 0.44 |
| H, 90% | A3, 1 | 4.8E+04, 0.24 | 2.5E+06 | 0.34 | 0.99 |
| H, 90% | A3, 0.3 | 1.1E+08, 0.21 | 3.3E+08 | 0.25 | 0.43 |
| I, 90% | A4-GL, 1 | 1.4E+06, 1.13 | 1.4E+06 | 0.78 | 1.00 |
| I, 90% | A5-GL, 0.3 | 1.3E+08, 0.36 | 3.5E+08 | 0.40 | 0.38 |
| J*, 92% | No treatment | Crumbly powder | Crumbly powder | | |
| D, 93% | A2-LBL, 1 | Crumbly paste | Crumbly paste | 0.27 | 0.80 |
| B, 92% | A3-GL, 1 | 2.0E+05, 0.28 | 3.6E+07 | 0.33 | 1.06 |
| F, 92% | A3-LBL, 1 | 5.4E+05, 0.28 | 2.6E+06 | 0.34 | 1.08 |
| G*, 92% | $M^{Vi}D^{Me}{}_{25}Si(OMe)_3$, 1 | 7.4E+04, 0.48 | 1.6E+06 | 0.33 | 1 standard |

The * denotes a comparative example.
Eta* was determined at 0.1% strain and 0.1 rad/s.

INDUSTRIAL APPLICABILITY

Without wishing to be bound by theory, it is thought that a polyorganosiloxane capable of hydrogen bonding as described herein is useful as a filler treating agent because this polyorganosiloxane may provide one or more benefits such as lower composition viscosity (as compared to a composition with the same matrix and filler loading but with a different filler treating agent). This may be due to improved surface coverage enabling higher filler loadings or skewing of the ratio of a multimodal particle size distribution to a larger content of small particles to take advantage of lower interfacial resistance and less shear thickening since the tether moiety is not consumed upon aging and would thus still be available in the matrix to passivate the newly generated high energy surface in a process to make a composition involving shear. The saccharide-siloxane polymer may provide an additional benefit of reducing susceptibility shear thickening of a composition containing a filler treated with a the saccharide-siloxane polymer. Saccharide-siloxane polymers may offer the advantage of not crosslinking over time with the cure system, when an uncured composition containing a curable matrix and a filler treated with the saccharide-siloxane polymer is stored for a period of time before use.

The invention claimed is:
1. A composition consisting essentially of:
   (i) a silicone-containing matrix,
   (ii) a filler having a surface capable of forming hydrogen bonding with a filler treating agent wherein the filler comprises a reinforcing filler, an extending filler, a thermally conductive filler, or a combination thereof, and
   (iii) the filler treating agent; where the filler treating agent comprises a polyorganosiloxane selected from a saccharide-siloxane polymer capable of hydrogen bonding, wherein the saccharide siloxane polymer has unit formula (I):

$$(R^1_{(3-a)}R^2_aSiO_{1/2})_b(R^1_{(2-c)}R^2_cSiO_{2/2})_d(R^2SiO_{3/2})_e$$
$$(R^1_3SiO_{1/2})_f(R^1_2SiO_{2/2})_g(R^1SiO_{3/2})_h(SiO_{4/2})_i;$$
where each subscript a is independently 0, 1, 2, or 3;
   subscript b has a value of 0 or greater;
   each subscript c is independently 0, 1, or 2;
   subscript d has a value of 0 or greater;
   subscript e has a value of 0 or greater;
   if a quantity (a+c) is 0, then subscript e has a value of 1 or greater;
   a quantity (b+d+e) is 1 or greater;
   subscript f has a value of 0 or greater;
   subscript g has a value of 0 or greater;
   subscript h has a value of 0 or greater;
   subscript i has a value of 0 or greater;
   each $R^1$ can be the same or different and comprises hydrogen, an alkyl group of 1 to 12 carbon atoms, an organic radical, or a group of formula $R^3$-Q;
      Q comprises an epoxy, cycloepoxy, primary or secondary amino, ethylenediamine, carboxy, halogen, vinyl, allyl, anhydride, or mercapto functionality;
   each $R^2$ has the formula $Z\text{-}(G^1)_n\text{-}(G^2)_o$, and there is an average of at least one $R^2$ per polymer molecule;
   $G^1$ is a saccharide component comprising 5 to 12 carbon atoms;
   a quantity (n+o) is 1 to 10, and
   subscript n or subscript o can be 0;
   $G^2$ is a saccharide component comprising 5 to 12 carbon atoms, and $G^2$ is additionally substituted with an organic radical or an organosilicon radical;
   each Z is a linking group independently selected from the group consisting of
      —$R^3$—NHC(O)—$R^4$—;
      —$R^3$—NHC(O)O—$R^4$—;
      —$R^3$—NH—C(O)—NH—$R^4$—;
      —$R^3$—C(O)—O—$R^4$—;
      —$R^3$—O—$R^4$—;
      —$R^3$—CH(OH)—$CH_2$—O—$R^4$—;
      —$R^3$—S—$R^4$—;
      —$R^3$—CH(OH)—$CH_2$—NH—$R^4$—;
      —$R^3$—N($R^1$)—$R^4$—;
      —NHC(O)—$R^4$—;
      —NHC(O)O—$R^4$—;
      —NH—C(O)—NH—$R^4$—;
      —C(O)—O—$R^4$—;
      —O—$R^4$—;
      —CH(OH)—$CH_2$—O—$R^4$—;
      —S—$R^4$—;
      —CH(OH)—$CH_2$—NH—$R^4$—;
      —N($R^1$)—$R^4$—;
      —$R^3$—NHC(O)—;
      —$R^3$—NHC(O)O—;
      —$R^3$—NH—C(O)—NH—;
      —$R^3$—C(O)—O—;
      —$R^3$—O—;
      —$R^3$—CH(OH)—$CH_2$—O—;
      —$R^3$—S—;
      —$R^3$—CH(OH)—$CH_2$—NH—; and
      —$R^3$—N($R^1$)—;
         where each $R^3$ and each $R^4$ is independently a divalent spacer comprising a group of formula $(R^5)_r(R^6)_s(R^7)_t$,
         where subscripts r, s, and t are each independently 0 or 1, and at least one of r, s and t is 1;
         each $R^5$ and each $R^7$ are independently either an alkyl group of 1 to 12 carbon atoms or a group of formula $(R^9O)_p$, where $R^9$ is a hydrocarbon group of 1 to 12 carbon atoms, subscript p is an integer ranging from 1 to 50, and each $R^9O$ may be the same or different and
         $R^6$ is —N($R^8$)—, where $R^8$ is hydrogen or an alkyl group of 1 to 12 carbon atoms,
   wherein the amount of filler treating agent ranges from 0.1% to 10%, based on the weight of the filler and where the polyorganosiloxane is free of condensable silyl groups.

2. The composition of claim 1, where the saccharide-siloxane polymer has formula (II): $R^2_aR^1_{(3-a)}SiO$—$[(R^2R^1SiO)_j(R^1_2SiO)_k]_m$—$SiR^1_{(3-a)}R^2_a$; where
   subscript j is an integer with a value ranging from 0 to 10,000;
   subscript k is an integer with a value ranging from 0 to 10,000;
   subscript m is an integer such that the polymer has a molecular weight less than 1 million.

3. The composition of claim 2, where the filler treating agent comprises a saccharide-siloxane polymer of formula (III):

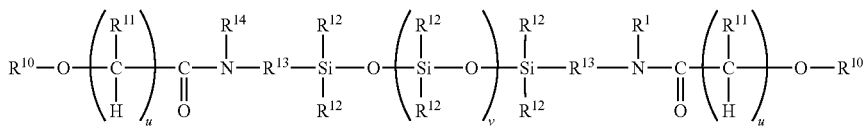

where each subscript u is independently 5 to 12;
each subscript v has a value ranging from 0 to 10,000;
each $R^{10}$ is a hydrogen atom or a monovalent hydrocarbon group;
each $R^{11}$ is independently a hydrogen atom, a hydroxyl group, an alkoxy group, or a saccharide group;
each $R^{12}$ is independently a monovalent hydrocarbon group;
each $R^{13}$ is independently a divalent organic group; and
each $R^{14}$ is independently a hydrogen atom or a monovalent hydrocarbon group of 1 to 4 carbon atoms.

4. The composition of claim 1, where the matrix is non-curable.

5. The composition of claim 1, where the matrix is curable.

6. The composition of claim 1, where the reinforcing filler is selected from the group consisting of mica, silica, titanium dioxide, and a combination thereof.

7. A grease composition comprising:
(i) a thermally conductive filler having a surface capable of forming hydrogen bonding with a filler treating agent, wherein the filler is selected from the group consisting of:
aluminum, copper, gold, nickel, palladium, platinum, silver, and alloys thereof;
a particle having a layer on a surface of the particle, where the particles are selected from the group consisting of aluminum, copper, gold, nickel, palladium, platinum, silver, and alloys thereof and the layers are selected from the group consisting of aluminum nitride, aluminum oxide, copper oxide, nickel oxide, silver oxide, and combinations thereof;
a particle comprising a core and an outer surface surrounding the core, where the outer surface is a metal and the core is selected from the group consisting of copper, solid glass, hollow glass, mica, nickel, and ceramic fiber; and
aluminum oxide, beryllium oxide, boron nitride, magnesium oxide, silicon carbide, tungsten carbide, zinc oxide, and combinations thereof, and
(ii) a matrix; where the matrix comprises a polyorganosiloxane capable of hydrogen bonding, where the polyorganosiloxane is free of condensable silyl groups, and the polyorganosiloxane is selected from a saccharide-siloxane polymer having unit formula (I):

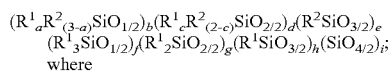
where each subscript a is independently 0, 1, 2, or 3;
subscript b is 0 or greater;
each subscript c is independently 0, 1, or 2;
subscript d is 0 or greater;
subscript e is 0 or greater;
if a quantity (a+c) is 0, then subscript e has a value of 1 or greater;
a quantity (b+d+e) is 1 or greater;
subscript f is 0 or greater;
subscript g is 0 or greater;
subscript h is 0 or greater;
subscript i is 0 or greater;
each $R^1$ can be the same or different and comprises hydrogen, an alkyl group of 1 to 12 carbon atoms, an organic radical, or a group of formula $R^3$-Q;
Q comprises an epoxy, cycloepoxy, primary or secondary amino, ethylenediamine, carboxy, halogen, vinyl, allyl, anhydride, or mercapto functionality;
each $R^2$ has the formula $Z$-$(G^1)_n$-$(G^2)_o$, and there is an average of at least one $R^2$ per polymer molecule;
$G^1$ is a saccharide component comprising 5 to 12 carbon atoms;
a quantity (n+o) is 1 to 10, and
subscript n or subscript o can be 0;
$G^2$ is a saccharide component comprising 5 to 12 carbon atoms, and $G^2$ is additionally substituted with an organic radical or an organosilicon radical;
each Z is a linking group independently selected from the group consisting of
—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—CH$_2$—O—$R^4$—;
—$R^3$—S—$R^4$—;
—$R^3$—CH(OH)—CH$_2$—NH—$R^4$—;
—$R^3$—N($R^1$)—$R^4$—;
—NHC(O)—$R^4$—;
—NHC(O)O—$R^4$—;
—NH—C(O)—NH—$R^4$—;
—C(O)—O—$R^4$—;
—O—$R^4$—;
—CH(OH)—CH$_2$—O—$R^4$—;
—S—$R^4$—;
—CH(OH)—CH$_2$—NH—$R^4$—;
—N($R^1$)—$R^4$—;
—$R^3$—NHC(O)—;
—$R^3$—NHC(O)O—;
—$R^3$—NH—C(O)—NH—;
—$R^3$—C(O)—O—;
—$R^3$—O—;
—$R^3$—CH(OH)—CH$_2$—O—;
—$R^3$—S—;
—$R^3$—CH(OH)—CH$_2$—NH—; and
—$R^3$—N($R^1$)—;
where each $R^3$ and each $R^4$ is independently a divalent spacer comprising a group of formula $(R^5)_r$ $(R^6)_s(R^7)_t$,
where subscripts r, s, and t are each independently 0 or 1, and at least one of r, s and t is 1;
each $R^5$ and each $R^7$ are independently either an alkyl group of 1 to 12 carbon atoms or a group of formula $(R^9O)_p$, where $R^9$ is a hydrocarbon group of 1 to 12 carbon atoms, subscript p is an integer ranging from 1 to 50, and each $R^9O$ may be the same or different and
$R^6$ is —N($R^8$)—, where $R^8$ is hydrogen or an alkyl group of 1 to 12 carbon atoms.

8. The composition of claim 1, where the filler is selected from the group consisting of aluminum, copper, gold, nickel, palladium, platinum, silver, and alloys thereof; a particle having a layer on a surface of the particle, where the particles are selected from the group consisting of aluminum, copper, gold, nickel, palladium, platinum, silver, and alloys thereof; and the layers are selected from the group consisting of aluminum nitride, aluminum oxide, copper oxide, nickel oxide, silver oxide, and combinations thereof; and a particle comprising a core and an outer surface surrounding the core, where the outer surface is a metal and the core is selected from the group consisting of copper, solid glass, hollow glass, mica, nickel, and ceramic fiber; and aluminum oxide, beryllium oxide, boron nitride, magnesium oxide, silicon carbide, tungsten carbide, zinc oxide, and combinations thereof.

9. The composition of claim 7, where the matrix comprises a saccharide-siloxane polymer having formula (II): $R^2_a R^1_{(3-a)}SiO-[(R^2R^1SiO)_j(R^1_2SiO)_k]_m-SiR^1_{(3-a)}R^2_a$; where
subscript j is an integer with a value ranging from 0 to 10,000;
subscript k is an integer with a value ranging from 0 to 10,000;
subscript m is an integer such that the polymer has a molecular weight less than 1 million.

10. The composition of claim 7, where the matrix comprises a saccharide-siloxane polymer of formula (III):

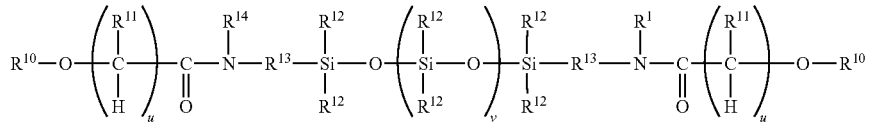

where each subscript u is independently 5 to 12;
each subscript v has a value ranging from 0 to 10,000;
each $R^{10}$ is a hydrogen atom or a monovalent hydrocarbon group;
each $R^{11}$ is independently a hydrogen atom, a hydroxyl group, an alkoxy group, or a saccharide group;
each $R^{12}$ is independently a monovalent hydrocarbon group;
each $R^{13}$ is independently a divalent organic group; and
each $R^{14}$ is independently a hydrogen atom or a monovalent hydrocarbon group of 1 to 4 carbon atoms.

11. The composition of claim 1, further comprising an additional ingredient selected from the group consisting of (iv) a stabilizer, (v) a plasticizer, (vi), an extender, (vii) an adhesion promoter, (viii) a fungicide, (ix) a rheological additive, (x) a flame retardant, (xi) a pigment, and a combination thereof.

12. A method for preparing a composition comprising:
(1) mixing ingredients comprising
(i) a silicone-containing matrix,
(ii) a thermally conductive filler having a surface capable of forming hydrogen bonding with a filler treating agent, and
(iii) the filler treating agent, the amount of which ranges from 0.1% to 10%, based on the weight of the filler; where the filler treating agent comprises a polyorganosiloxane selected from a saccharide-siloxane polymer capable of hydrogen bonding, wherein the saccharide siloxane polymer has unit formula (I):

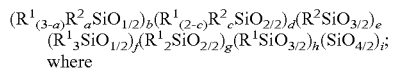

where each subscript a is independently 0, 1, 2, or 3;
subscript b has a value of 0 or greater;
each subscript c is independently 0, 1, or 2;
subscript d has a value of 0 or greater;
subscript e has a value of 0 or greater;
if a quantity (a+c) is 0, then subscript e has a value of 1 or greater;
a quantity (b+d+e) is 1 or greater;
subscript f has a value of 0 or greater;
subscript g has a value of 0 or greater;
subscript h has a value of 0 or greater;
subscript i has a value of 0 or greater;
each $R^1$ can be the same or different and comprises hydrogen, an alkyl group of 1 to 12 carbon atoms, an organic radical, or a group of formula $R^3$-Q;
Q comprises an epoxy, cycloepoxy, primary or secondary amino, ethylenediamine, carboxy, halogen, vinyl, allyl, anhydride, or mercapto functionality;
each $R^2$ has the formula $Z-(G^1)_n-(G^2)_o$, and there is an average of at least one $R^2$ per polymer molecule;
$G^1$ is a saccharide component comprising 5 to 12 carbon atoms;
a quantity (n+o) is 1 to 10, and
subscript n or subscript o can be 0;
$G^2$ is a saccharide component comprising 5 to 12 carbon atoms, and $G^2$ is additionally substituted with an organic radical or an organosilicon radical;
each Z is a linking group independently selected from the group consisting of
—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—$CH_2$—O—$R^4$—;
—$R^3$—S—$R^4$—;
—$R^3$—CH(OH)—$CH_2$—NH—$R^4$—;
—$R^3$—N($R^1$)—$R^4$—;
—NHC(O)—$R^4$—;
—NHC(O)O—$R^4$—;
—NH—C(O)—NH—$R^4$—;
—C(O)—O—$R^4$—;
—O—$R^4$—;
—CH(OH)—$CH_2$—O—$R^4$—;
—S—$R^4$—;
—CH(OH)—$CH_2$—NH—$R^4$—;
—N($R^1$)—$R^4$—;
—$R^3$—NHC(O)—;
—$R^3$—NHC(O)O—;
—$R^3$—NH—C(O)—NH—;
—$R^3$—C(O)—O—;
—$R^3$—O—;
—$R^3$—CH(OH)—$CH_2$—O—;
—$R^3$—S—;
—$R^3$—CH(OH)—$CH_2$—NH—; and
—$R^3$—N($R^1$)—;
where each $R^3$ and each $R^4$ is independently a divalent spacer comprising a group of formula $(R^5)_r$, $(R^6)_s(R^7)_t$, where subscripts r, s, and t are each independently 0 or 1, and at least one of r, s and t is 1;
each $R^5$ and each $R^7$ are independently either an alkyl group of 1 to 12 carbon atoms or a group of formula $(R^9O)_p$, where $R^9$ is a hydrocarbon group of 1 to 12 carbon atoms, subscript p is an integer ranging from 1 to 50, and each $R^9O$ may be the same or different and
$R^6$ is $-N(R^8)-$, where $R^8$ is hydrogen or an alkyl group of 1 to 12 carbon atoms,
where the polyorganosiloxane is free of condensable silyl groups, thereby treating the filler with the filler treating agent in situ, and
optionally (2) curing the composition, when a curable matrix is used.

13. A method for preparing a composition, comprising:
(1) mixing a thermally conductive filler having a surface capable of forming hydrogen bonding with a filler treating agent, with a solution comprising a solvent and the filler treating agent in the amount of from 0.1% to 10%, based on the weight of the filler, where the filler treating agent comprises a polyorganosiloxane selected from a saccharide-siloxane polymer capable of hydrogen bonding, wherein the saccharide siloxane polymer has unit formula (I):

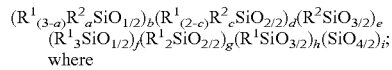
where each subscript a is independently 0, 1, 2, or 3;
subscript b has a value of 0 or greater;
each subscript c is independently 0, 1, or 2;
subscript d has a value of 0 or greater;
subscript e has a value of 0 or greater;
if a quantity (a+c) is 0, then subscript e has a value of 1 or greater;
a quantity (b+d+e) is 1 or greater;
subscript f has a value of 0 or greater;
subscript g has a value of 0 or greater;
subscript h has a value of 0 or greater;
subscript i has a value of 0 or greater;
each $R^1$ can be the same or different and comprises hydrogen, an alkyl group of 1 to 12 carbon atoms, an organic radical, or a group of formula $R^3$-Q;
Q comprises an epoxy, cycloepoxy, primary or secondary amino, ethylenediamine, carboxy, halogen, vinyl, allyl, anhydride, or mercapto functionality;
each $R^2$ has the formula $Z-(G^1)_n-(G^2)_o$, and there is an average of at least one $R^2$ per polymer molecule;
$G^1$ is a saccharide component comprising 5 to 12 carbon atoms;
a quantity (n+o) is 1 to 10, and subscript n or subscript o can be 0;
$G^2$ is a saccharide component comprising 5 to 12 carbon atoms, and $G^2$ is additionally substituted with an organic radical or an organosilicon radical;
each Z is a linking group independently selected from the group consisting of
—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—$CH_2$—O—$R^4$—;
—$R^3$—S—$R^4$—;
—$R^3$—CH(OH)—$CH_2$—NH—$R^4$—;
—$R^3$—N($R^1$)—$R^4$—;
—NHC(O)—$R^4$—;
—NHC(O)O—$R^4$—;
—NH—C(O)—NH—$R^4$—;
—C(O)—O—$R^4$—;
—O—$R^4$—;
—CH(OH)—$CH_2$—O—$R^4$—;
—S—$R^4$—;
—CH(OH)—$CH_2$—NH—$R^4$—;
—N($R^1$)—$R^4$—;
—$R^3$—NHC(O)—;
—$R^3$—NHC(O)O—;
—$R^3$—NH—C(O)—NH—;
—$R^3$—C(O)—O—;
—$R^3$—O—;
—$R^3$—CH(OH)—$CH_2$—O—;
—$R^3$—S—;
—$R^3$—CH(OH)—$CH_2$—NH—; and
—$R^3$—N($R^1$)—;
where each $R^3$ and each $R^4$ is independently a divalent spacer comprising a group of formula $(R^5)_r(R^6)_s(R^7)_t$,
where subscripts r, s, and t are each independently 0 or 1, and at least one of r, s and t is 1;
each $R^5$ and each $R^7$ are independently either an alkyl group of 1 to 12 carbon atoms or a group of formula $(R^9O)_p$,
where $R^9$ is a hydrocarbon group of 1 to 12 carbon atoms, subscript p is an integer ranging from 1 to 50, and each $R^9O$ may be the same or different and
$R^6$ is $-N(R^8)-$, where $R^8$ is hydrogen or an alkyl group of 1 to 12 carbon atoms,
where the polyorganosiloxane is free of condensable silyl groups
(2) mixing the product of step (1) with an ingredient comprising a silicone-containing matrix, and
optionally (3) removing the solvent.

14. A method for preparing a composition, comprising:
(1) mixing a thermally conductive filler having a surface capable of forming hydrogen bonding with a filler treating agent with a solution comprising a solvent and the filler treating agent in the amount of from 0.1% to 10%, based on the weight of the filler, where the filler treating agent comprises a polyorganosiloxane selected from a saccharide-siloxane polymer capable of hydrogen bonding, wherein the saccharide siloxane polymer has unit formula (I):

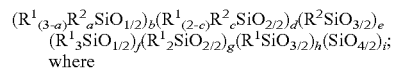
where each subscript a is independently 0, 1, 2, or 3;
subscript b has a value of 0 or greater;
each subscript c is independently 0, 1, or 2;
subscript d has a value of 0 or greater;
subscript e has a value of 0 or greater;
if a quantity (a+c) is 0, then subscript e has a value of 1 or greater;
a quantity (b+d+e) is 1 or greater;
subscript f has a value of 0 or greater;
subscript g has a value of 0 or greater;
subscript h has a value of 0 or greater;
subscript i has a value of 0 or greater;
each $R^1$ can be the same or different and comprises hydrogen, an alkyl group of 1 to 12 carbon atoms, an organic radical, or a group of formula $R^3$-Q;

Q comprises an epoxy, cycloepoxy, primary or secondary amino, ethylenediamine, carboxy, halogen, vinyl, allyl, anhydride, or mercapto functionality;

each $R^2$ has the formula $Z\text{-}(G^1)_n\text{-}(G^2)_o$, and there is an average of at least one $R^2$ per polymer molecule;

$G^1$ is a saccharide component comprising 5 to 12 carbon atoms;

a quantity (n+o) is 1 to 10, and subscript n or subscript o can be 0;

$G^2$ is a saccharide component comprising 5 to 12 carbon atoms, and $G^2$ is additionally substituted with an organic radical or an organosilicon radical;

each Z is a linking group independently selected from the group consisting of

—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—CH$_2$—O—$R^4$—;
—$R^3$—S—$R^4$—;
—$R^3$—CH(OH)—CH$_2$—NH—$R^4$—;
—$R^3$—N($R^1$)—$R^4$—;
—NHC(O)—$R^4$—;
—NHC(O)O—$R^4$—;
—NH—C(O)—NH—$R^4$—;
—C(O)—O—$R^4$—;
—O—$R^4$—;
—CH(OH)—CH$_2$—O—$R^4$—;
—S—$R^4$—;
—CH(OH)—CH$_2$—NH—$R^4$—;
—N($R^1$)—$R^4$—;
—$R^3$—NHC(O)—;
—$R^3$—NHC(O)O—;
—$R^3$—NH—C(O)—NH—;
—$R^3$—C(O)—O—;
—$R^3$—O—;
—$R^3$—CH(OH)—CH$_2$—O—;
—$R^3$—S—;
—$R^3$—CH(OH)—CH$_2$—NH—; and
—$R^3$—N($R^1$)—;

where each $R^3$ and each $R^4$ is independently a divalent spacer comprising a group of formula $(R^5)_r(R^6)_s(R^7)_t$, where subscripts r, s, and t are each independently 0 or 1, and at least one of r, s and t is 1;

each $R^5$ and each $R^7$ are independently either an alkyl group of 1 to 12 carbon atoms or a group of formula $(R^9O)_p$, where $R^9$ is a hydrocarbon group of 1 to 12 carbon atoms, subscript p is an integer ranging from 1 to 50, and each $R^9O$ may be the same or different and $R^6$ is —N($R^8$)—, where $R^8$ is hydrogen or an alkyl group of 1 to 12 carbon atoms, where the polyorganosiloxane is free of condensable silyl groups (2) removing the solvent, and (3) mixing the product of step (2) with an ingredient comprising a silicone-containing matrix.

15. A device comprising:

a) an electronic component, b) a thermal interface material, and c) a heat spreader;

where the thermal interface material is interposed between the electronic component and the heat spreader along a thermal path extending from a surface of the electronic component to a surface of the heat spreader, where the thermal interface material comprises the composition of claim 1.

16. The composition of claim 7, further comprising an additional ingredient selected from the group consisting of (iv) a stabilizer, (v) a plasticizer, (vi), an extender, (vii) an adhesion promoter, (viii) a fungicide, (ix) a rheological additive, (x) a flame retardant, (xi) a pigment, and a combination thereof.

17. A device comprising:

a) an electronic component, b) a thermal interface material, and c) a heat spreader;

where the thermal interface material is interposed between the electronic component and the heat spreader along a thermal path extending from a surface of the electronic component to a surface of the heat spreader, where the thermal interface material comprises the composition of claim 7.

* * * * *